United States Patent
Shaffer et al.

(10) Patent No.: US 8,595,359 B2
(45) Date of Patent: Nov. 26, 2013

(54) EFFICIENT MESSAGE DISTRIBUTION FOR DIRECTED ACYCLIC GRAPHS

(75) Inventors: Shmuel Shaffer, Palo Alto, CA (US); Sandeep Jay Shetty, San Jose, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 13/043,168

(22) Filed: Mar. 8, 2011

(65) Prior Publication Data
US 2012/0233326 A1   Sep. 13, 2012

(51) Int. Cl.
*G06F 15/173* (2006.01)

(52) U.S. Cl.
USPC ........................................ 709/225

(58) Field of Classification Search
USPC ........... 709/201, 225, 238; 370/252, 351, 400
See application file for complete search history.

(56) References Cited

U.S. PATENT DOCUMENTS

| | | | |
|---|---|---|---|
| 6,970,449 B1 | 11/2005 | Smith et al. | |
| 7,095,739 B2 | 8/2006 | Mamillapalli et al. | |
| 7,362,776 B2 | 4/2008 | Meier et al. | |
| 7,379,433 B1 | 5/2008 | Patel et al. | |
| 7,379,435 B1 | 5/2008 | Kinder | |
| 7,385,977 B2 | 6/2008 | Wu et al. | |
| 7,421,578 B1 | 9/2008 | Huang et al. | |
| 7,423,986 B2 | 9/2008 | Grayson et al. | |
| 7,447,166 B1 | 11/2008 | Kaluve et al. | |
| 7,496,078 B2 | 2/2009 | Rahman | |
| 7,505,450 B2 | 3/2009 | Castagnoli | |
| 7,512,106 B2 | 3/2009 | Van Tran et al. | |
| 7,519,733 B1 | 4/2009 | Thubert et al. | |
| 7,599,367 B2 | 10/2009 | Radhakrishnan et al. | |
| 7,623,474 B2 | 11/2009 | Tran et al. | |
| 7,633,926 B1 | 12/2009 | Sethi et al. | |
| 7,706,345 B2 | 4/2010 | Meier et al. | |
| 7,729,277 B2 | 6/2010 | Jordan et al. | |
| 7,801,137 B2 | 9/2010 | Vasseur et al. | |
| 7,839,843 B2 | 11/2010 | Dontu et al. | |
| 7,844,057 B2 | 11/2010 | Meier et al. | |

(Continued)

OTHER PUBLICATIONS

Thubert, et al., "RPL Objective Function Zero", draft-ietf-roll-of0-05, IETF Internet-Draft, Jan. 2011, 10 pages.

(Continued)

*Primary Examiner* — Benjamin R Bruckart
*Assistant Examiner* — Karina J Garcia-Ching
(74) *Attorney, Agent, or Firm* — Edwards Wildman Palmer LLP; James M. Behmke; Stephen D. LeBarron

(57) ABSTRACT

In one embodiment, a particular node in a primary DAG receives a distributed message from distributing nodes, and from this, deterministically selects a distributing node as a distributing parent in a secondary DAG from which distributed messages are to be received. The particular node may then inform the deterministically selected distributing parent that it is being used by the particular node as its distributing parent, and if the selected distributing parent is not the particular node's primary DAG parent, then the primary DAG parent is informed that it need not send distributed messages for the particular node. In another embodiment, a distributing node continues to repeat distributed messages in response to receiving notification that it is being used as a distributing parent, and if a primary DAG parent, prevents the repeating in response to receiving a notification from all of its child nodes that it need not send distributed messages.

28 Claims, 24 Drawing Sheets

(56) References Cited

U.S. PATENT DOCUMENTS

| | | | |
|---|---|---|---|
| 7,873,020 B2 | 1/2011 | Hunt et al. | |
| 7,899,027 B2 | 3/2011 | Castagnoli et al. | |
| 8,270,313 B2* | 9/2012 | Tao et al. | 370/252 |
| 2008/0205428 A1 | 8/2008 | Jordan et al. | |
| 2009/0023418 A1 | 1/2009 | Grevers, Jr. | |
| 2009/0135722 A1 | 5/2009 | Boers et al. | |
| 2011/0228788 A1* | 9/2011 | Thubert et al. | 370/400 |

OTHER PUBLICATIONS

Vasseur, et al., "Routing Metrics Used for Path Calculation in Low Power and Lossy Networks", draft-ietf-roll-routing-metrics-18, IETF Internet-Draft, Feb. 2011, 31 pages.

Winter, et al., "RPL: IPv6 Routing Protocol for Low Power and Lossy Networks", draft-ietf-roll-rpl-18, IETF Internet-Draft; Feb. 2011, 160 pages.

* cited by examiner

TABLE 600
(E.G., NODE 34)

| PREFERENCE 605 | ID 610 | POSITION 615 |
|---|---|---|
| 1 | 23 | LOWER |
| 2 | 24 | LOWER |
| 3 | 25 | LOWER |
| 4 | 33 | SAME |
| 5 | 35 | SAME |

FIG. 6

EFFICIENT MESSAGE DISTRIBUTION FOR DIRECTED ACYCLIC GRAPHS

TECHNICAL FIELD

The present disclosure relates generally to computer networks, and, more particularly, to directed acyclic graph (DAG) routing and management and message distribution in DAGs.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Commonly, wireless sensors utilize mesh networks to communicate with a head-end node (e.g., data collector) and with each other. That is, each sensor (e.g., smart meter) can act as a node in the mesh, where nodes in LLN mesh networks either originate or forward packets over the air. Broadcast messages are commonly used by mesh networks in scenarios such as demand response (DR), software upgrade, etc. When a node receives a broadcast packet it first verifies that this is a new packet (a packet which the node is seeing for the first time). If the packet is found to be a new one, the node retransmits it. However, if the node has already seen this packet, the packet is dropped so as to limit broadcast storm effects. The mass forwarding action by all of the nodes may cause numerous packet collisions resulting in inefficient utilization of the LLN resources. The problem is especially pronounced when node density is high.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example neighbor table of distributing nodes;

DESCRIPTION OF EXAMPLE EMBODIMENTS

Overview

Figure 1:
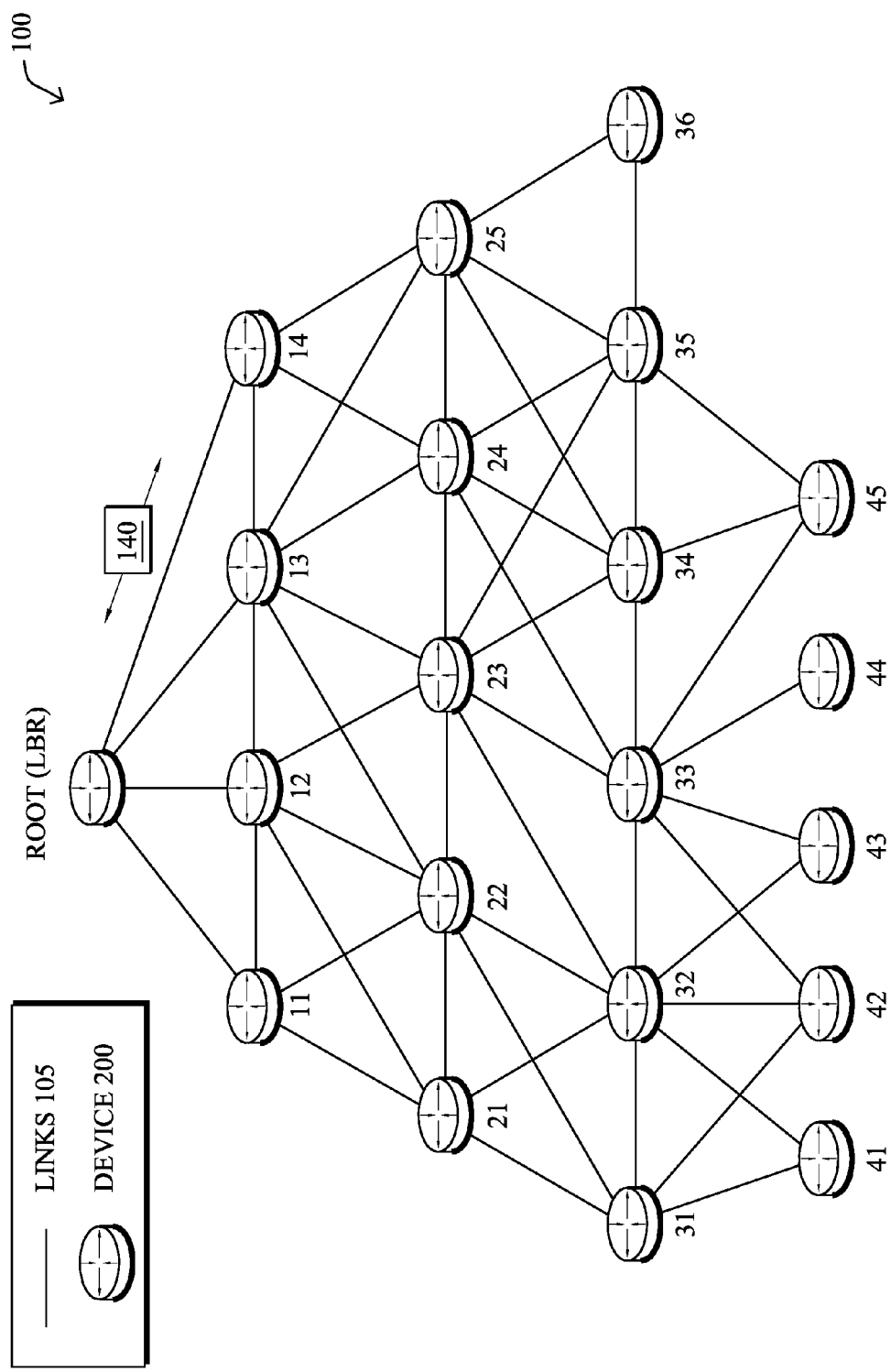
FIG. 1 illustrates an example computer network.

According to one or more embodiments of the disclosure, a particular node in a primary directed acyclic graph (DAG) in a computer network may receive a distributed message from one or more distributing nodes. From this, the particular node deterministically selects a distributing node from the one or more distributing nodes as a distributing parent on a secondary DAG from which distributed messages are to be received. As such, the particular node may inform the deterministically selected distributing parent that it is being used by the particular node as its distributing parent. Also, in response to the selected distributing parent not being a primary DAG parent of the particular node, the particular node informs the primary DAG parent that it need not send distributed messages for the particular node.

According to one or more additional embodiments of the disclosure, a distributing node in a primary DAG transmits a distributed message, and in response to receiving a notification that a particular node is using the distributing node as a distributing parent in a secondary DAG, may continue to repeat distributed messages. Alternatively, if the distributing node is a primary DAG parent, then in response to receiving a notification from all of its child nodes that the primary DAG parent need not send distributed messages for the respective child node, the primary DAG parent may prevent repeating of distributed messages.

Description

A computer network is a geographically distributed collection of nodes interconnected by communication links and segments for transporting data between end nodes, such as personal computers and workstations, or other devices, such as sensors, utility meters, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different to locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data, along with routing/relaying data from other sensors, to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers, such as alarm messages. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200 (e.g., labeled as shown, "Root," "11," "12," ... "44," "45," and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with the root node generally centralized among a plurality of surrounding nodes Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate. In this context, a protocol consists of a set of rules defining how the nodes interact with each other.

Figure 2:
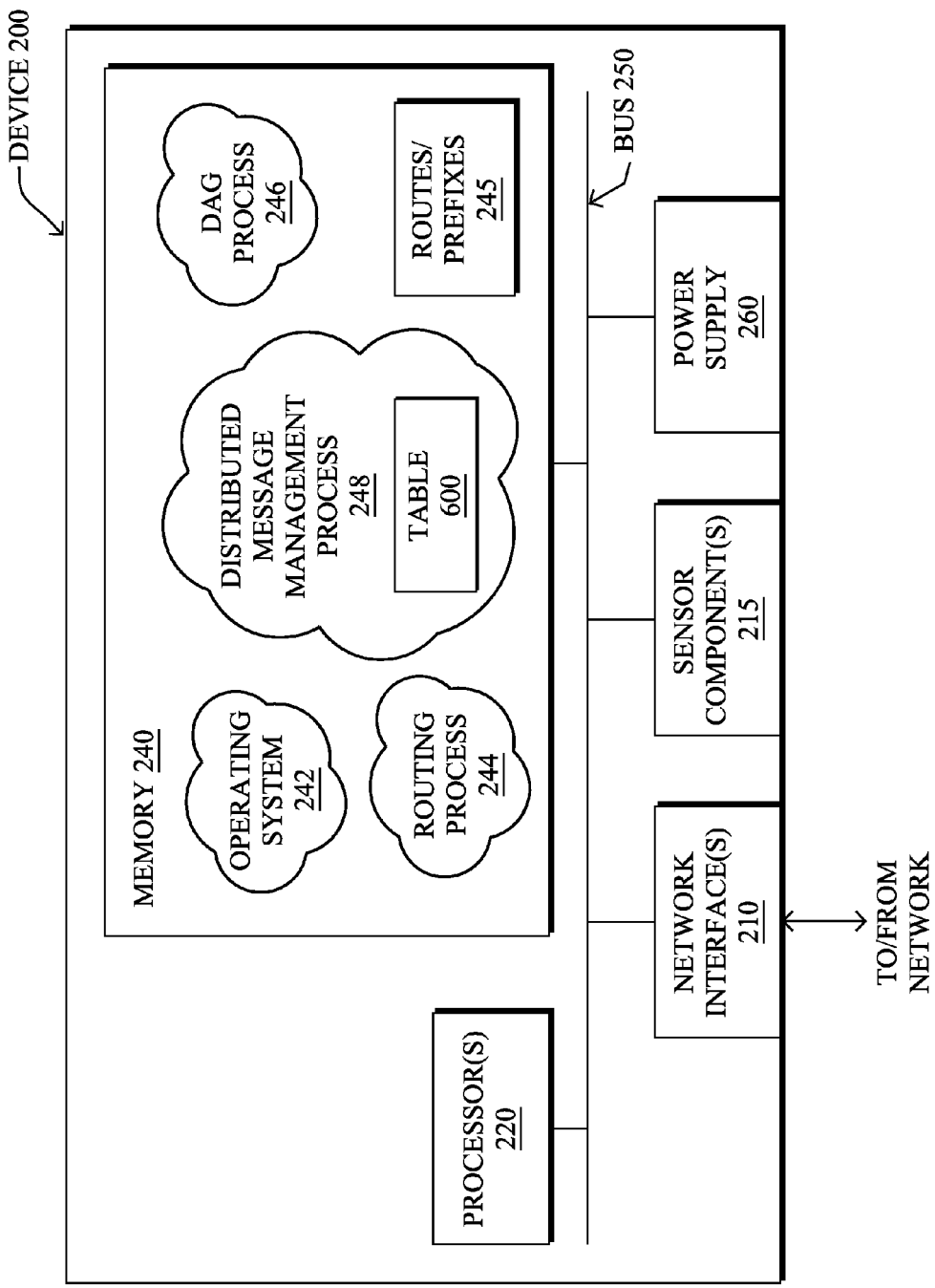
FIG. 2 illustrates an example network device/node.

FIG. 2 is a schematic block diagram of an example node/device 200 that may be used with one or more embodiments described herein, e.g., as nodes 11-45 and ROOT. The device may comprise one or more network interfaces 210 (e.g., wireless), an optional sensor component 215 (e.g., sensors/actuators for sensor network devices), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100 (e.g., wirelessly). The network interfaces may be configured to transmit and/or receive data using a variety of different communication protocols, particularly wireless protocols as noted above and as will be understood by those skilled in the art. Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures, such as routes or prefixes 245 (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, which may include an illustrative directed acyclic graph (DAG) process 246. Also, a distributed message management process 248 and associated table 600 may also be present in memory 240, for use as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes, such that, e.g., distributed message management process 248 may be part of DAG process 246, etc. Additionally, it will be apparent to those skilled in the art that while the disclosure herein describes the processes as residing in the node 200, some of these processes may operate in servers attached to the network 100 or in a distributed fashion, namely both in the node 200 and in network attached servers.

Routing process (services) 244 contains computer executable instructions which may be executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, to on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-18> by Winter, at al. (Feb. 4, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic) RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-18> by Vasseur, et al. (Feb. 22, 2011 version). Further, an example OF (e.g., a default OF) may be found in an IETF Internet Draft, entitled "RPL Objective Function 0" <draft-ietf-roll-of0-05> by Thubert (Jan. 5, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive s receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the to leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

Figure 3:
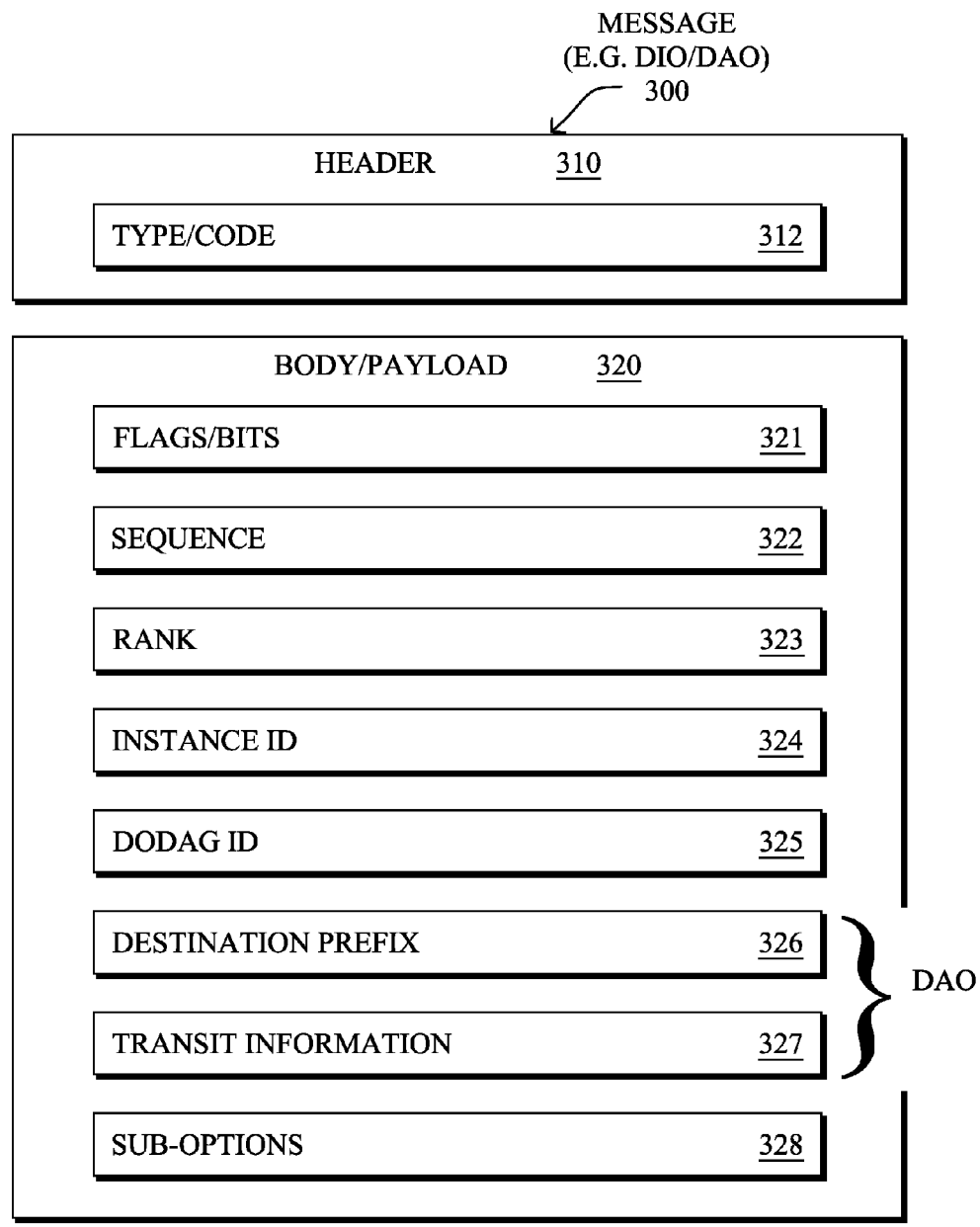
FIG. 3 illustrates an example message.

FIG. 3 illustrates an example simplified control message format 300 that may be used for discovery and route dissemination when building a DAG, e.g., as a DIO or DAO. Message 300 illustratively comprises a header 310 with one or more fields 312 that identify the type of message (e.g., a RPL control message), and a specific code indicating the specific type of message, e.g., a DIO or a DAO (or a DAG Information Solicitation). Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For either DIOs or DAOs, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, etc., as may be described herein, e.g., in one or more type-length-value (TLV) fields.

Figure 4:
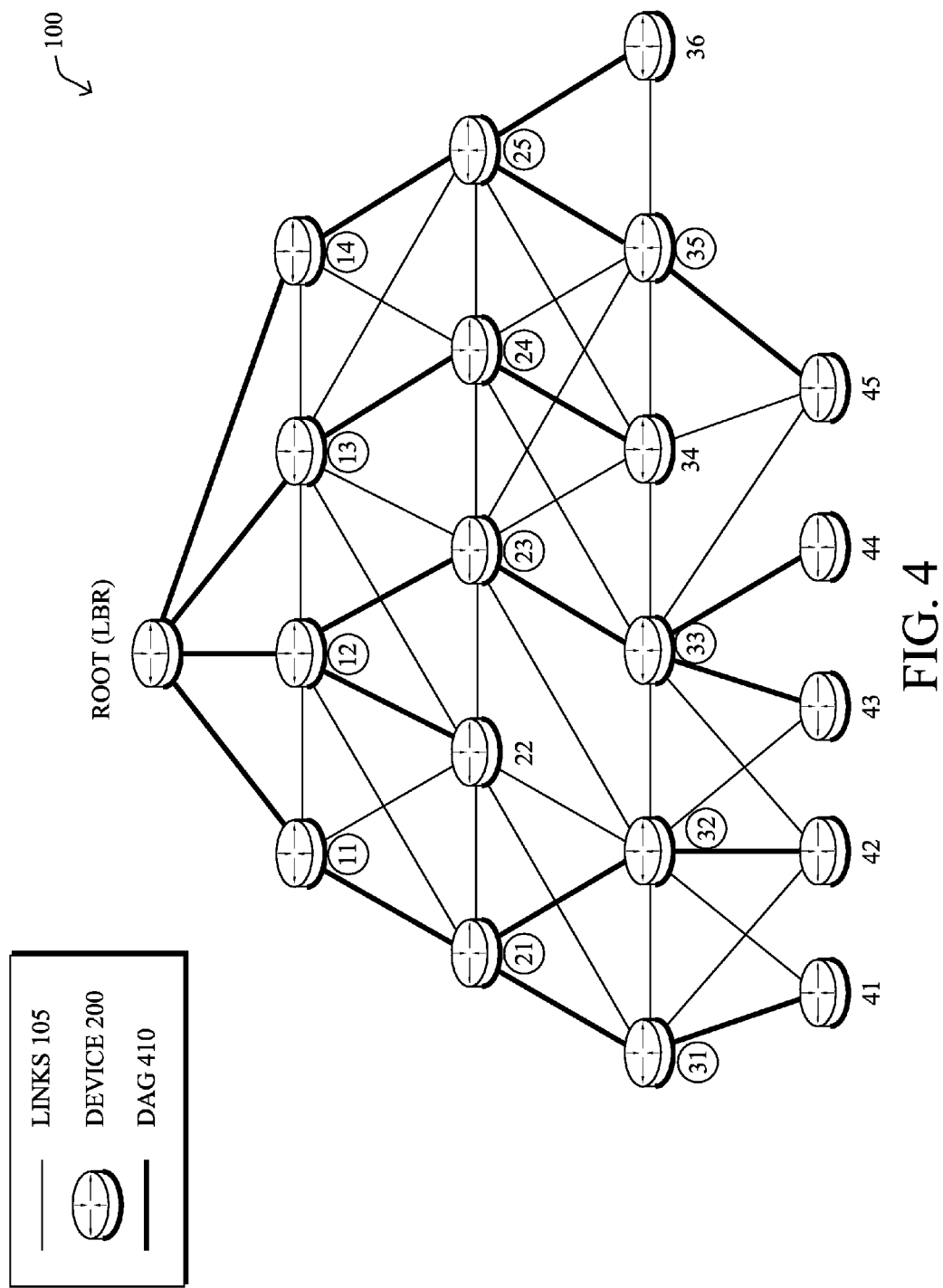
FIG. 4 illustrates an example directed acyclic graph (DAG) in the computer network of FIG. 1.

FIG. 4 illustrates an example simplified DAG that may be created, e.g., through the techniques described above (by DAG process 246), within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes.

As noted above, one of the major issue in LLNs, especially on non-synchronized shared media links (e.g., wireless links, etc.) is link congestion: not only is the bandwidth very limited, but it is well-known that the efficiency of data transmission collapses once the offered load exceeds some known limit. Thus congestion may lead to link collapse. Congestion may occur in a number of circumstances, for example, congestion may occur in response to a burst of critical messages after power failure in the grid, the failure of a node or a set of links causing a DAG topology change with a large number of new children joining a node, etc., or even simply in response generally to there being too much traffic in the network.

In particular, broadcast messages are commonly used by mesh networks in scenarios such as demand response (DR), software upgrade, etc. When a node receives a broadcast packet it first verifies that this is a new packet (a packet which the node is seeing for the first time). If the packet is found to be a new one, the node retransmits the packet if it is a parent node (circled node IDs in FIG. 4). However, if the node has already seen this packet, the packet is dropped so as to limit broadcast storm effects. The mass forwarding action by all of the nodes may cause numerous packet collisions resulting in inefficient utilization of the LLN resources. The problem is especially pronounced when node density is high.

Figure 5A:
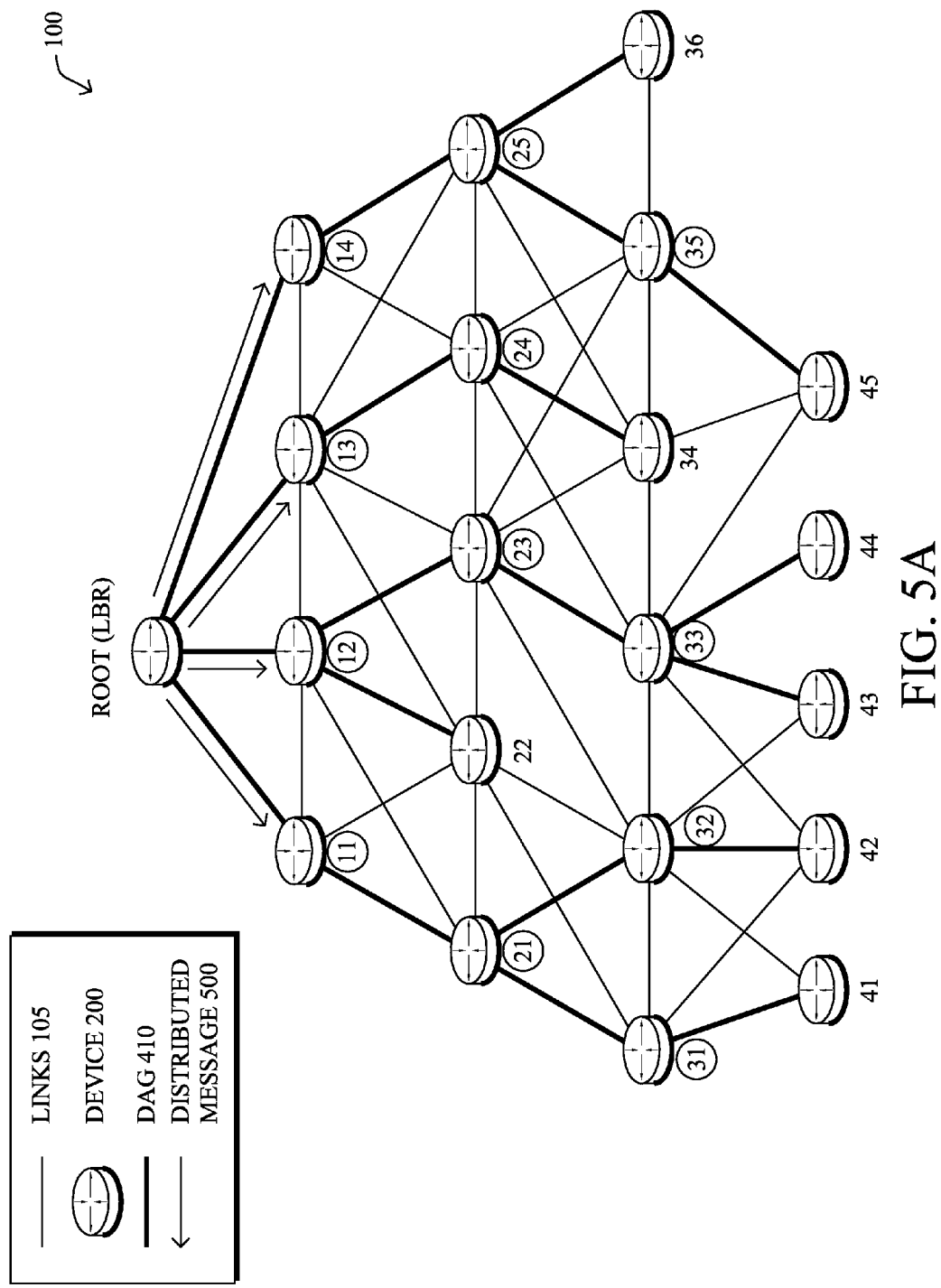
FIGS. 5A-E illustrate an example of a distributed message (e.g., broadcast, multicast, etc.) on the DAG in the network of FIG. 4.
Figure 5B:
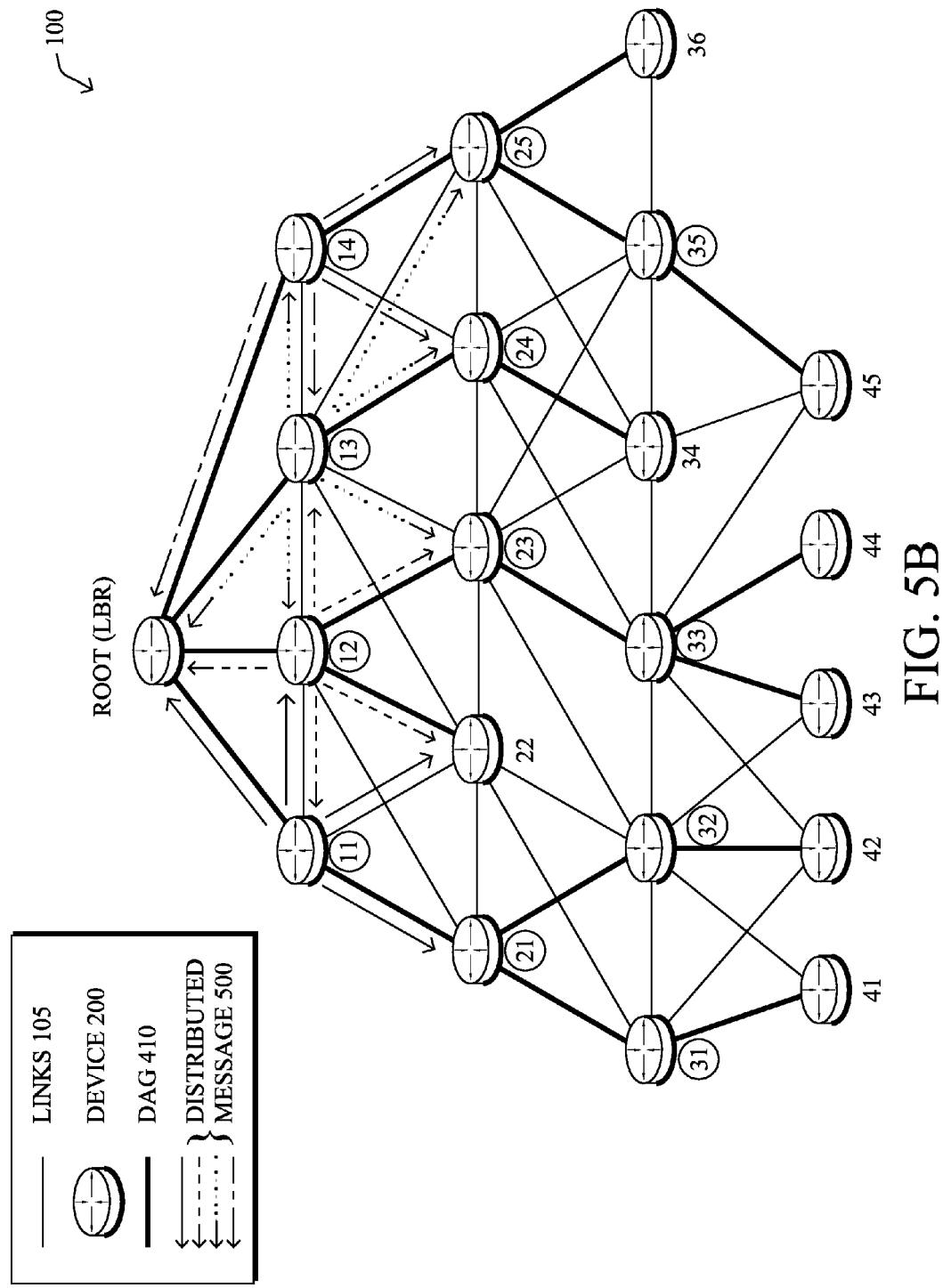

FIGS. 5A-E illustrate an example message distribution (e.g., a broadcast message) in the network of FIG. 1. For instance, assume that the root node sends a distributed message 500 (e.g., a broadcast message, multicast message, etc.) into the network 100. In FIG. 5A, the message may reach nodes within listening range of the root node, e.g., nodes 11, 12, 13, and 14. As shown in FIG. 5B, each of these nodes repeats the message 500 into the network (each node's transmission shown as a particular line type in the figure). As can be seen in FIG. 5B, in shared medium transmissions (e.g., wireless networks), the actual distribution of the message from a node reaches any node that is within listening distance of the transmission.

For example, node 22 receives the same repeated message from node 11, 12, and 13. These three separate messages must be processed by node 22 to determine whether they are duplicates that do not require repetition, not to mention the fact that each message transmission may interfere with (e.g., collide, conflict, etc.) with node 22's reception of the other messages. That is, if each neighbor nodes of node 22 is attempting to transmit at the same time and over the same frequency band, node 22's links may become overloaded with traffic, and node 22 may be unable to interpret the conflicting signals. In this instance, once the congestion occurs, it may be exacerbated by the fact that the transmitting nodes (distributing nodes) experiencing lost traffic begin to retransmit their traffic for additional attempts, further increasing the amount of traffic at this congested location.

Figure 5C:
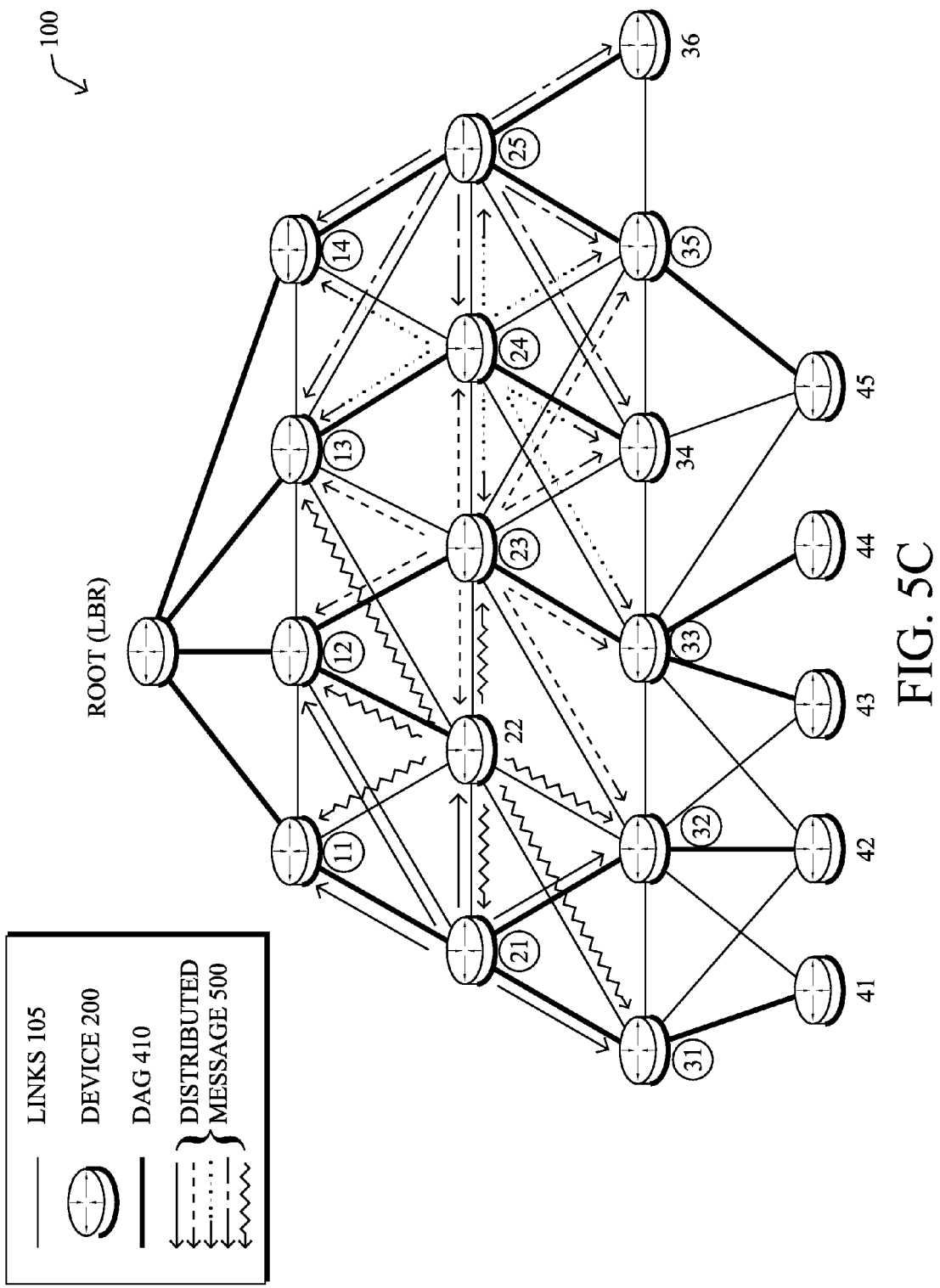
Figure 5D:
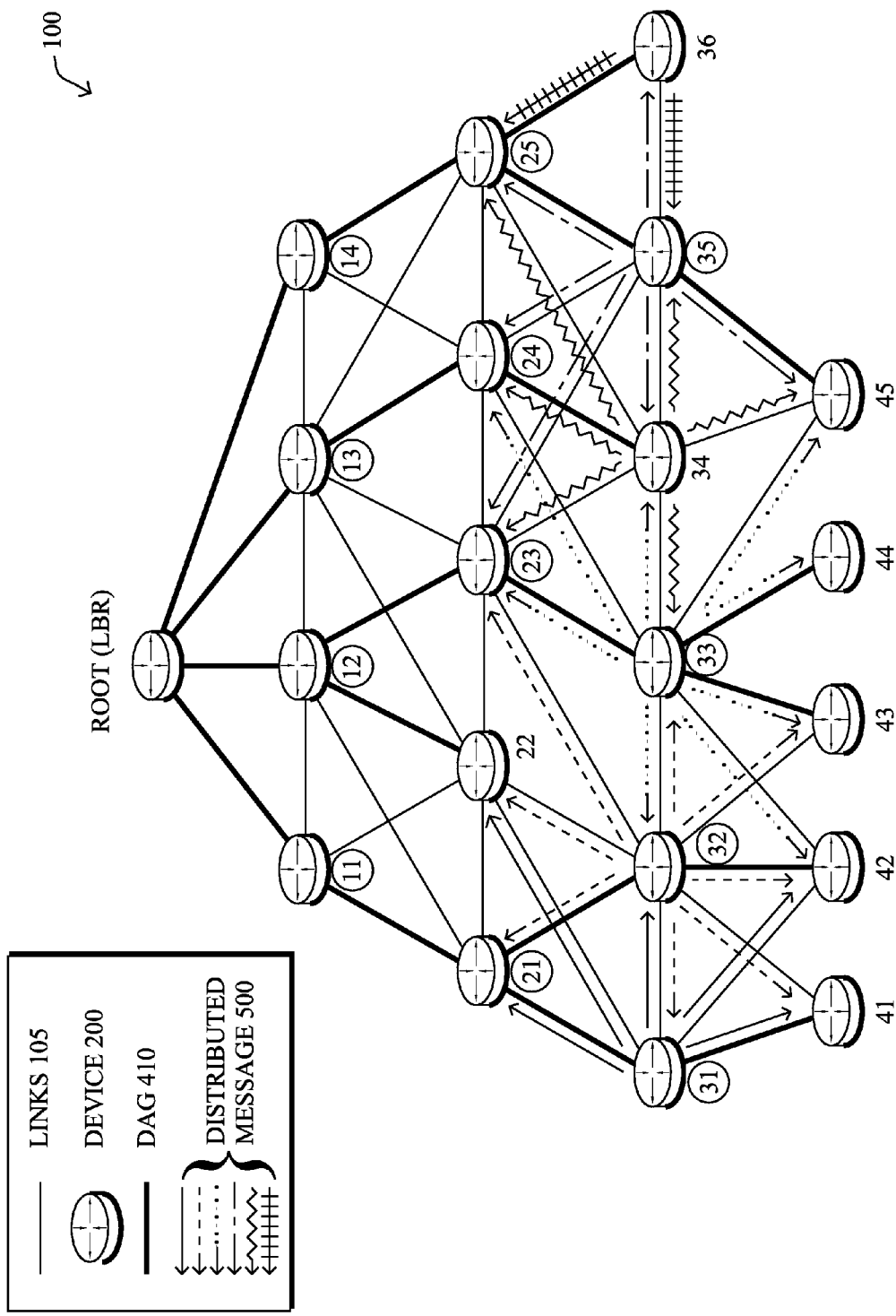
Figure 5E:
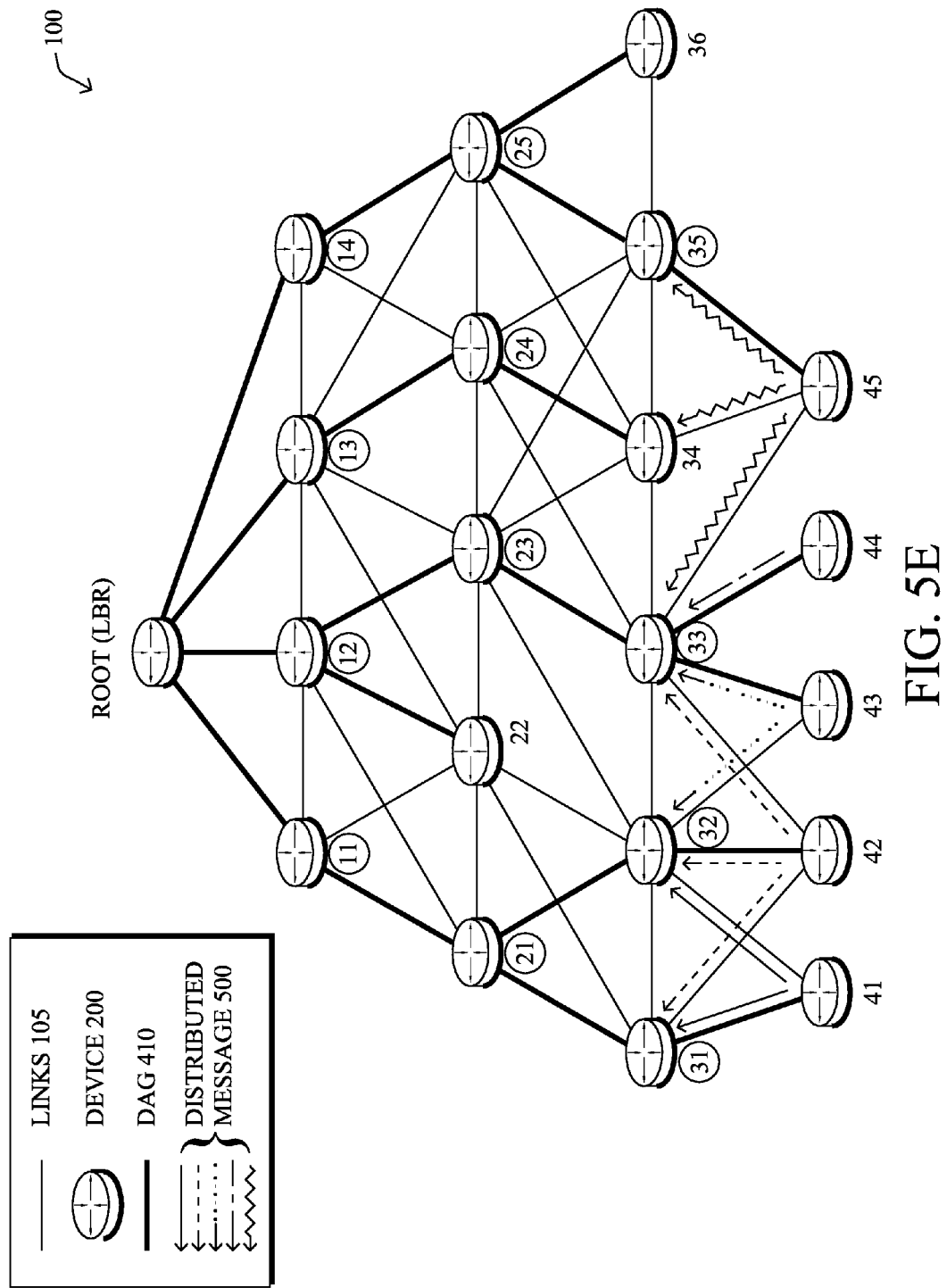

The problem continues into the next levels of retransmission in FIGS. 5C, 5D, and 5E where each node repeats the distributed message 500 into the network, creating further congestion and additional duplicate messages (often referred to as a broadcast "storm"). For example, by the time FIG. 5D is reached in succession, node 22 has received seven copies of the same message. Note that this simplified example also assumes single-hop listening ranges (i.e., node 12 cannot hear node 32's transmission), though this is not always the case, particularly in dense networks, and the problem is increased dramatically in such multi-hop listening range networks. Those skilled in the art will appreciate that transmission from farther nodes which are not marked as direct neighbors may still interfere with the reception of node 22 by increasing the noise floor experienced by node 22.

Note that while the example distributed message 500 in FIGS. 5A-E is a broadcast message (all nodes repeat the message), the example is equally applicable to multicast messages. For multicast messages, only DAG parents (of a multicast tree) repeat the message, thus differing from the examples shown in FIG. 5B (node 22 would not transmit), FIG. 5C, (node 34 would not transmit), and there would be no FIG. 5E equivalent. Though reduced, it can be clearly understood that the multicast example would also suffer from the same problems as the broadcast example above.

Efficient Message Distribution

The techniques herein provide a mechanism that reduces the number of packet collisions and duplicate packets in a communication network, and hence improves network utilization and efficiency. In particular, as described in greater detail below, the DAG 410 (which is used for sending packets between the DAG root and nodes in the mesh) may be used as an initial state. The technique then utilizes a distributed algorithm to identify nodes in a secondary DAG which should refrain from retransmitting "distributed messages" (used herein to specifically indicate broadcast or multicast messages) because the packets they transmit cause packet collisions without improving the reliability of broadcast message delivery. In other words, to optimize delivery of distributed messages over a mesh network, the techniques herein adaptively identify nodes which could be instructed not to transmit (without adversely affecting broadcast delivery), such that once a node is identified as belonging to this group (a non-distributing parent), the node stops retransmitting distributed messages, thus freeing up airtime and reducing packet collisions, increasing network efficiency and accelerating and improving the reliability of distributed message delivery. Note that the adaptiveness of the of the techniques herein is key in wireless LLNs where it cannot be determined a priori which nodes will be in listening range of other nodes, which may vary during operation because of link flaps, attenuations, etc.

Specifically, according to one or more embodiments of the disclosure as described in detail below, a particular node in a primary DAG may receive a distributed message from distributing nodes, and from this, deterministically selects a distributing node as a distributing parent on a secondary DAG (e.g., a "multicast and broadcast (MaB) DAG") from which distributed messages are to be received. As such, the particular node may inform the deterministically selected distributing parent that it is being used by the particular node as its distributing parent, and if the selected distributing parent is not the particular node's primary DAG parent, then the primary DAG parent is informed that it need not send distributed messages for the particular node. Also, in one or more embodiments herein a distributing node in a primary DAG continues to repeat distributed messages in response to receiving a notification that it is being used as a distributing parent in a secondary DAG, and if it is a primary DAG parent, prevents the repeating in response to receiving a notification from all of its child nodes that it need not send distributed messages for the respective child node.

Illustratively, the techniques described herein may be performed by hardware, software, and/or firmware, such as in accordance with distributed message management process 248, which may contain computer executable instructions executed by the processor 220 to perform functions relating to the novel techniques described herein, e.g., in conjunction with DAG process 246. For example, the techniques herein may be treated as extensions to conventional protocols, such as the RPL protocol, and as such, would be processed by similar components understood in the art that execute the RPL protocol, accordingly.

Operationally, the techniques begin constructing a distribution tree, termed a multicast and broadcast (MaB) DAG herein, based on the primary DAG 410 originally computed in FIG. 4 above (e.g., by RPL), which is used for message delivery between the DAG root and nodes in the mesh. During primary DAG 410's creation, each primary DAG parent node may be notified by its children that they depend on it for distributed message delivery, and the DAG parent sets its state to a distributing parent to repeat distributed messages, accordingly. (Note that should a child node use multiple primary DAG parents, only one parent is selected as a distributing parent for the MaB DAG.) Consequently each primary parent takes ownership of making sure that its children are getting the distributed message, either from the original parent (itself) or from a new distributing parent, described below.

According to one or more embodiments, once a distributed message 500 is transmitted in the network 100 (as shown in FIGS. 5A-E), the techniques herein may begin optimizing the MaB DAG. Note that this first distributed message 500 may be any message 500, or else may be a specific message that is sent out for the purpose of optimizing the distribution tree described herein.

When a node (e.g., node 34) receives a distributed message 500 from one or more distributing nodes, it may create a table in which it keeps the IDs (e.g., media access control or "MAC" addresses) of nodes it can hear. (The terminology "hear" is used herein to describe the ability of a node to receive and decode a message without an error or with errors which can be corrected by the Cyclic Redundancy Check (CRC) code.)

FIG. 6 illustrates an example table 600 (e.g., for node 34) that may be maintained by the illustrative distributed message management process 248. Entries within the table 600 may comprise a plurality of fields, such as a "preference" field 605, an identification (ID) field 610, and a position field 615. Generally, nodes (e.g., node 34) may receive distributed messages (e.g., broadcast packets) from its own parent (a lower position/rank in the DAG, i.e., closer to the root node), from another node at the same rank as its parent, or from a sibling node (a same position in the DAG, i.e., the same hop distance to the root node). The sibling node may or may not share the same parent with node 34. Nodes which are of higher rank (further from the root) than node 34 generally need not be used to populate the table, thus in certain embodiments limiting the table (and thus deterministic selection of a distributing parent below) to distributing nodes that are at a same or lower rank in the DAG than the particular node.

According to the techniques herein, each node deterministically selects a distributing node (e.g., from table 600) as a distributing parent on the MaB DAG from which distributed messages are to be received. For instance, each node may select a top-preferred node in the list as its distributing parent. In particular, regardless of which preferential ordering is used in field 605, the configuration should be shared with all of the nodes in the network in order to provide a deterministic distributed algorithm where any node in the network given the same options would choose the same result. Notably, for redundancy, in one or more embodiments each node may deterministically select a plurality of distributing nodes to be a plurality of redundant distributing parents from which redundant distributed messages are to be received by the particular node.

In one embodiment, the ID of each distributing node may be determined, such as a media access control (MAC) address of the nodes, and the preference 605 in the table may be based upon MAC address order (e.g., highest ID/MAC first or lowest ID/MAC first). Here, the node (or nodes) with the highest (or lowest) MAC addresses may be selected as distributing parents for the node (e.g., node 23). Though using MAC addresses is described, other preferential ordering techniques may be used herein, such as IP addresses, other IDs (e.g., in the example herein, the node IDs are used), etc.

The node (e.g., node 34) may then inform its deterministically selected distributing node (e.g., node 23) that it has been selected to be a distributing parent in the MaB DAG. Said differently, each node may send a message to the N (e.g., N=1 if single, N=2 or more for redundancy) nodes in its table 600 advising them that the node would like to use them as distributing parents, even if these nodes are not primary DAG parents. In accordance with yet another example embodiment (described below) node 34 may notify its primary DAG parent, node 24, that it will not require its services for receiving multicast or broadcast messages (distributed messages 500).

Figure 7:
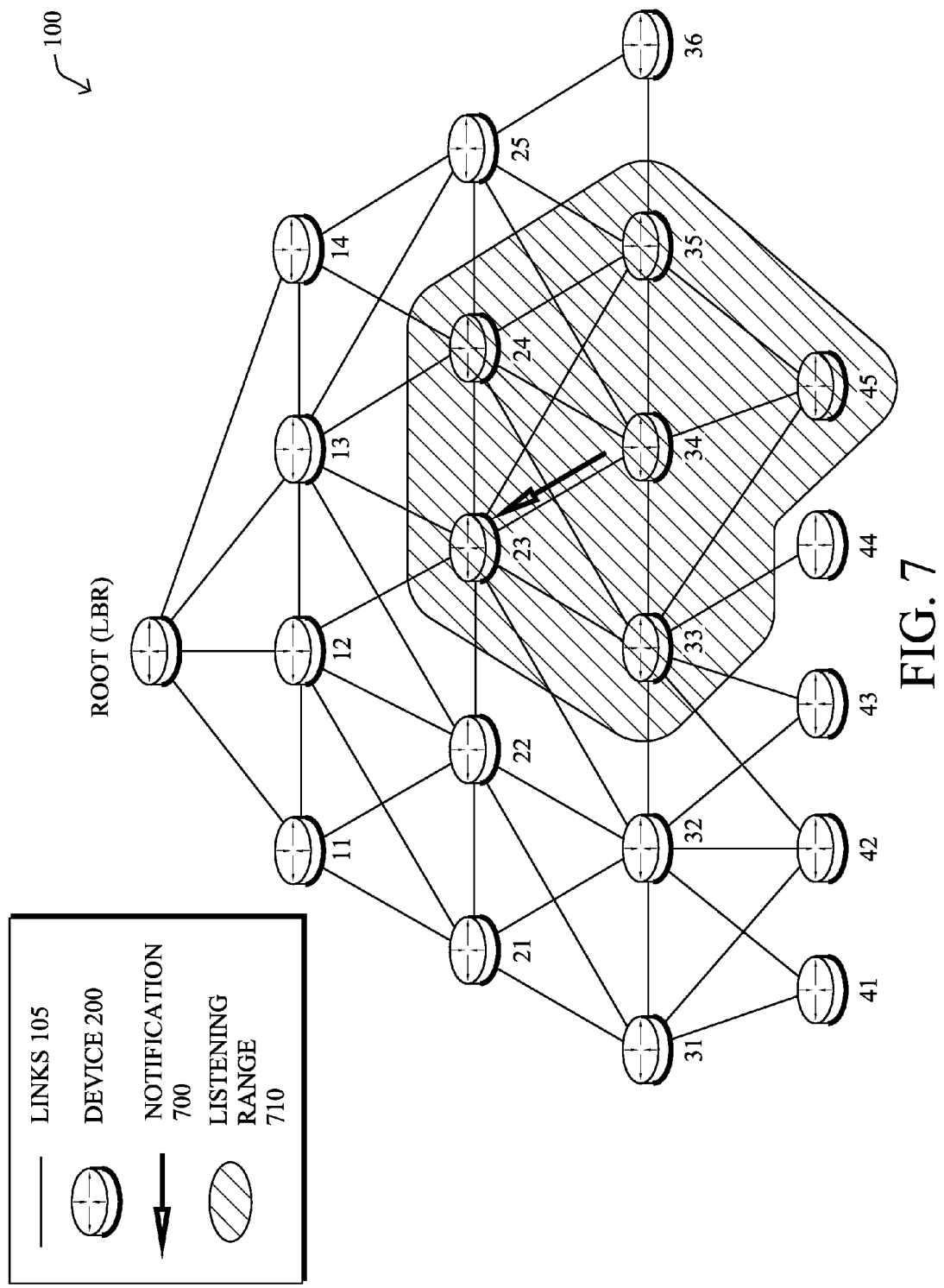
FIG. 7 illustrates an example notification passing.

FIG. 7 illustrates an example of such a notification 700 that may be sent from a particular node (e.g., node 34) to its selected distributing parent (e.g., node 23). Note that in FIG. 7, the listening range 710 of the transmission is shown differently than the arrows on links in FIGS. 5A-E above, simply as an alternative visualization.

After getting an acknowledgement from these N potential distributing parents that they will send distributed messages for the particular node, each particular node may then send a message to its original primary parent (a parent on the primary DAG tree 410) advising its primary DAG parent that it is no longer needed for obtaining the distributed messages. That is, in response to the selected distributing parent(s) not being the particular node's primary DAG parent, the particular node informs the primary DAG parent that the primary DAG parent need not send distributed messages for the particular node. Note that the particular node may also notify its primary DAG parent of IDs (and/or MAC addresses) of the nodes from which it plans to obtain distributed messages, i.e., a list of one or more distributing parents of the particular node.

If a primary DAG parent node obtains notifications from all of its children notifying it that they no longer rely on it for obtaining distributed (i.e., broadcast or multicast) messages, and if the primary DAG parent did not receive a request from any other node to become its distributing parent, the primary DAG parent node sets its state to a non-distributing node (e.g., to a broadcast packet non-repeating state) to thus prevent repeating of distributed messages. Conversely, in response to receiving a notification that some node is using a particular node as a distributing parent, then the operating state of lo that node (whether a DAG parent or not) is set to a distributing parent, to thus repeat distributed messages 500 in a MaB DAG. In a dense deployment, this stops a large percentage of nodes from retransmitting distributed messages (i.e., broadcast and multicast packets).

Figure 8A:
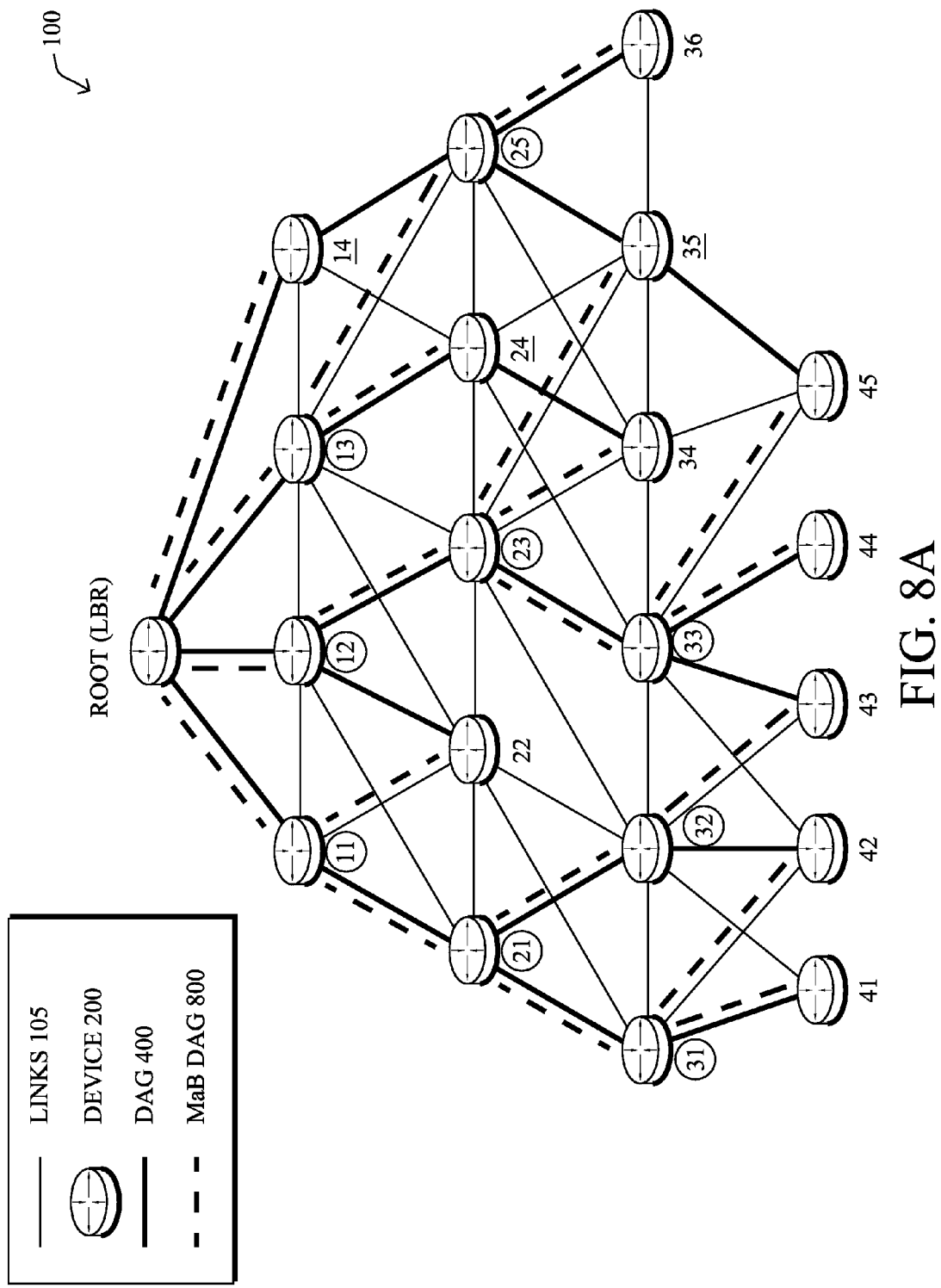
FIGS. 8A-C illustrate an example multicast and broadcast (MaB) DAG.

FIG. 8A illustrates an example distribution tree, MaB DAG 800, that is created based on which nodes are distributing parents (IDs are circled) and which nodes depend upon those distributing parents to receive the distributed messages. As shown in FIG. 8A, in particular, is a comparison to the primary DAG 410. Note how the underlined IDs indicate nodes that are primary DAG parents, but not distributing parents in MaB DAG 800 (e.g., nodes 14, 24, and 35), based on receiving notifications from their children (nodes 25, 34, and 45, respectively).

Figure 8B:
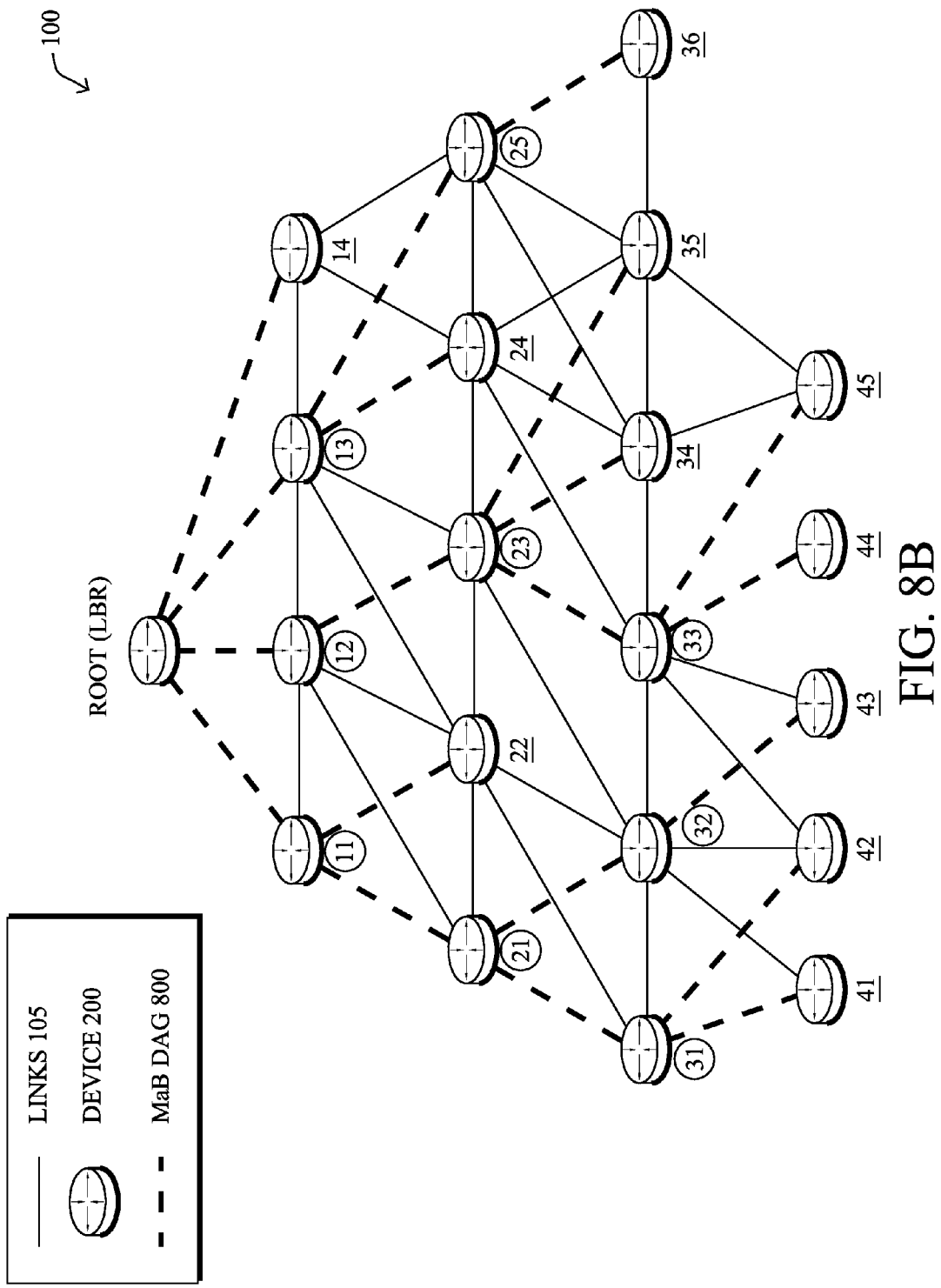

FIG. 8B illustrates the same MaB DAG 800 of FIG. 8A, but without the underlying primary DAG 410. Note that in FIG. 8B, the circled node IDs still represents distributing parents, but now the underlined IDs represents all of the nodes that were previously transmitting the distributed messages (with reference to FIGS. 5A-E above), and that are now preventing the repeating of a received distributed message. Specifically, where before twenty nodes would distribute the message 500 (in addition to the root node itself), now only nine nodes are configured as distributing parents to repeat the message accordingly.

Note that while the MaB DAG 800 of FIGS. 8A and 8B illustrate a general progression from lower-ranked nodes to higher-ranked nodes, it should be recalled from above that siblings may also be chosen as distributing parents. In particular, the illustrative embodiment shows preferential ordering based on node IDs (e.g., MAC addresses). However, in deployed situations, it is unlikely for the MAC addresses of lower-ranked nodes to always be lower than sibling nodes. That is, where as shown the node IDs are based on rank in the DAG (10's, 20's, 30's, etc.), real MAC addresses may result in preferential ordering of MaB DAG parents that considers siblings (and excludes higher-ranked nodes, which may also have a "more preferred" MAC address).

Figure 8C:
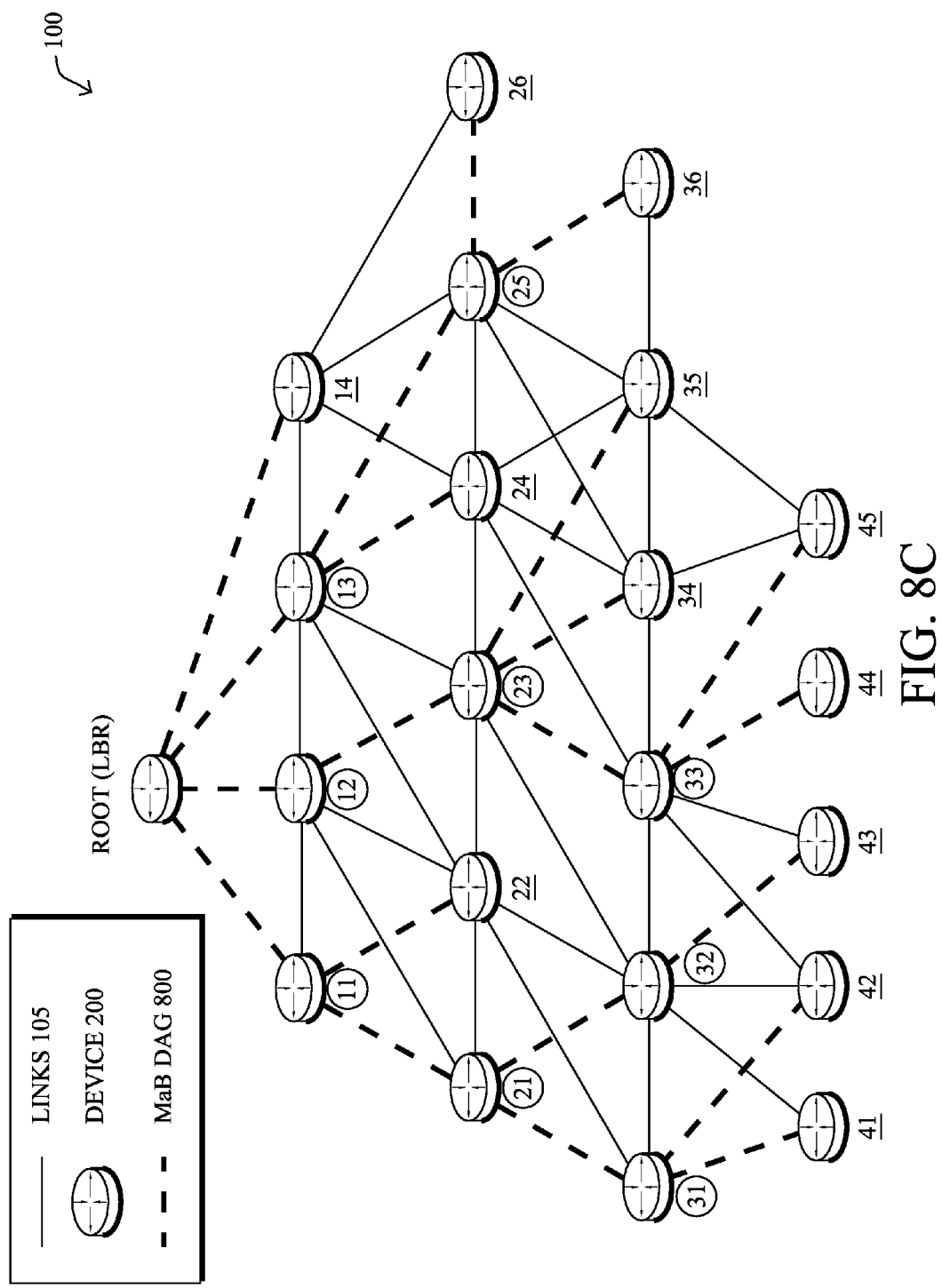

For example, FIG. 8C illustrates an additional node 26 that may utilize a sibling (same-ranked node) as a distributing parent, assuming, that is, that node 25 is more preferred to node 14 (e.g., node 25 has a lower MAC address than node 14). Note that provisions may be emplaced to ensure that the sibling, or at least one sibling in a series of sibling selections, has a distributing parent at a lower rank in order to provide connectivity to the root node of the MaB DAG.

In accordance with one or more embodiments herein, recursive enhancements may be performed on the MaB DAG as it begins to take shape in order to maximize the number of nodes no longer acting as distributing nodes. For example, in a first embodiment, if a distributing parent determines that it must be a distributing parent for at least one particular node, then it may broadcast (locally) an indication of this into the network. Any node that receives this indication may then select that "mandatory" distributing parent.

Figure 9:
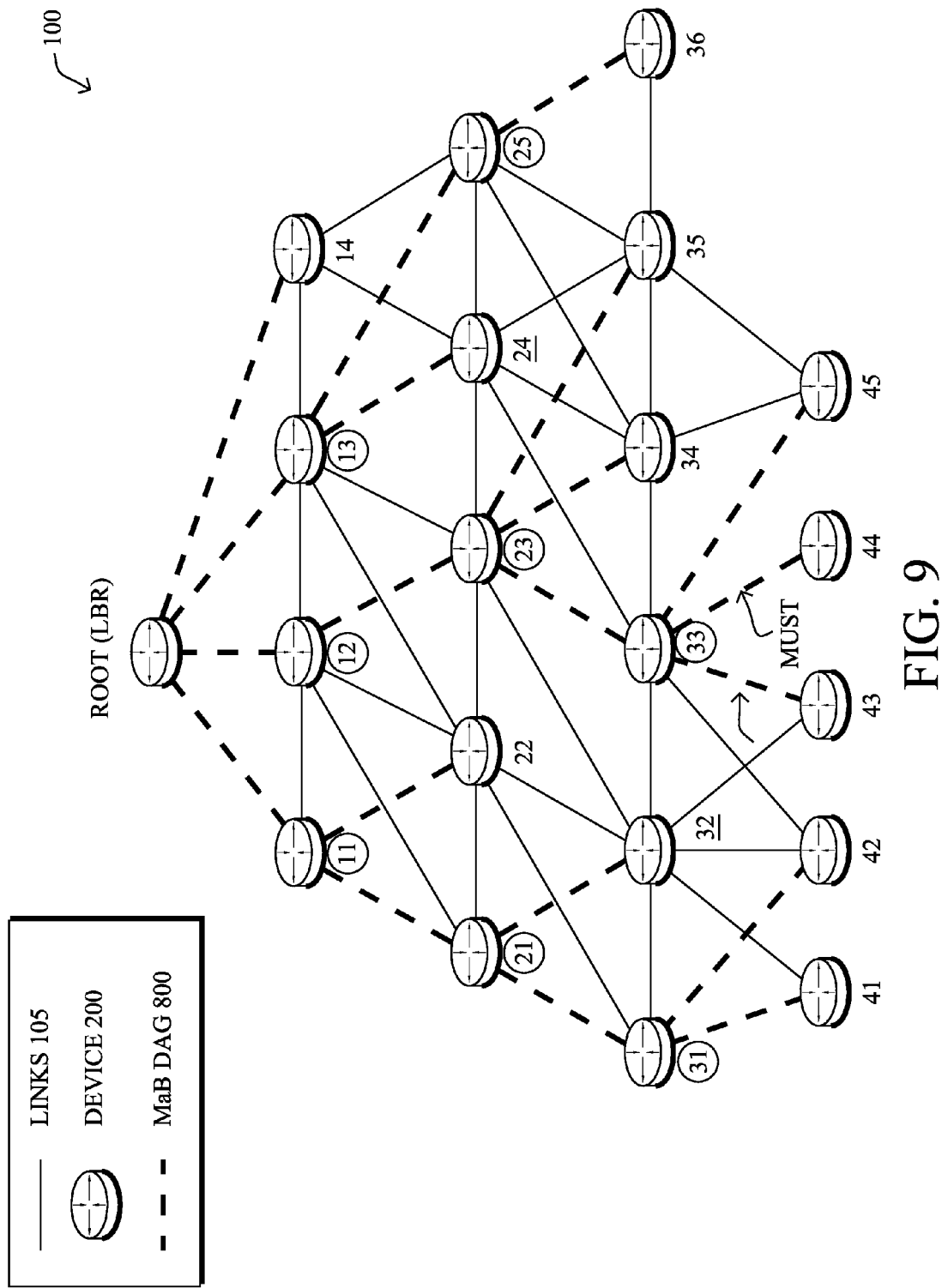
FIG. 9 illustrates an example MaB DAG alteration.

FIG. 9 illustrates an example of this, where distributing parent node 33 must be the node that forwards/repeats a distributed message to node 44. For example, this can be determined based on knowledge of the topology, or from an explicit indication from node 44 (e.g., a neighbor table) showing that node 33 is the only node that can reach node 44. Accordingly, once node 33 notifies its other neighbors that it must be a distributing parent, then those neighbors, such as node 43, may alter their selection to the mandatory distributing parent. In this illustrative example, this change alleviates node 32 from being a distributing parent (node 43 may rescind its previous selection of node 32), the change shown by underlining node 32's ID (distributing parents of MaB DAG 800 remain circled).

In an additional embodiment for recursive MaB DAG enhancement, if a distributing parent has a small number of distribution children (e.g., a small percentage of its DAG children still relying on it for broadcast message forwarding), then this distributing parent may suggest that these distribution children select another distributing parent, if available. In other words, in response to a number of particular nodes using the parent node as a distributing parent being below a threshold, the distributing parent may request that the particular nodes using the parent node as a distributing parent select another distributing parent. Any node receiving this request may then attempt to select another distributing parent, if available.

Figure 10:
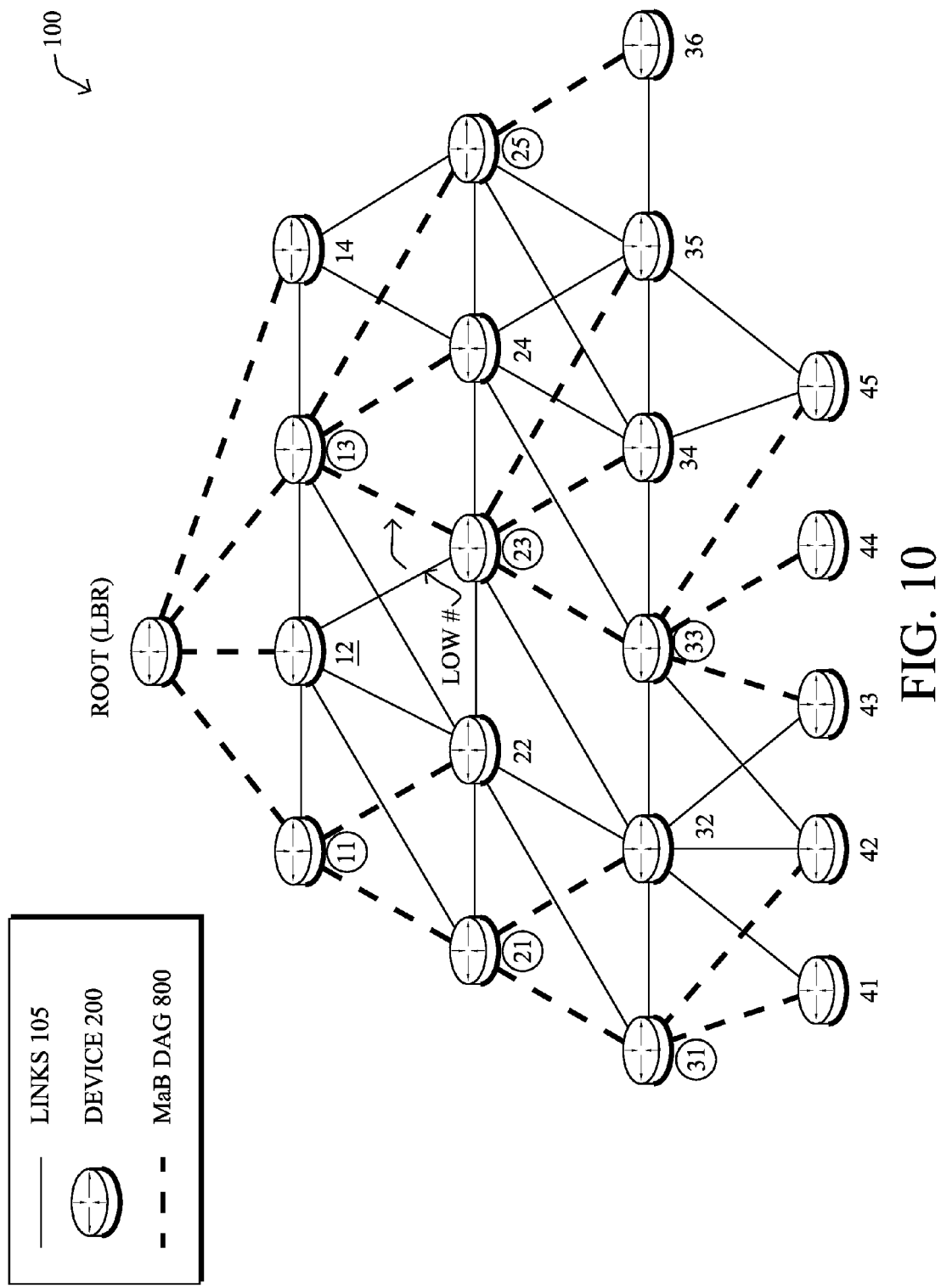
FIG. 10 illustrates another example MaB DAG alteration.

FIG. 10 illustrates an example of this embodiment, where distributing parent node 12 has only one distribution child node, node 23. As such, node 12 may request that node 23 attempt to find another distributing parent, at which time, node 23 (in the example) may select node 13 as its new distributing parent. Accordingly, once notified by node 23, node 12 may set its state to a non-distributing node, again reducing the number of distributing nodes in the network.

The techniques herein therefore reduce the number of duplicate distributed messages (i.e., broadcast/multicast packets) which need to be processed by the various nodes, thus reducing the wasted resources which are required for transmitting the messages by a first node, receiving the duplicate packets (at times hundreds of them) by a second node, comparing the IDs of the received packet with IDs of packets previously received, and discarding the duplicate packets once they have been identified as such.

Figure 11A:
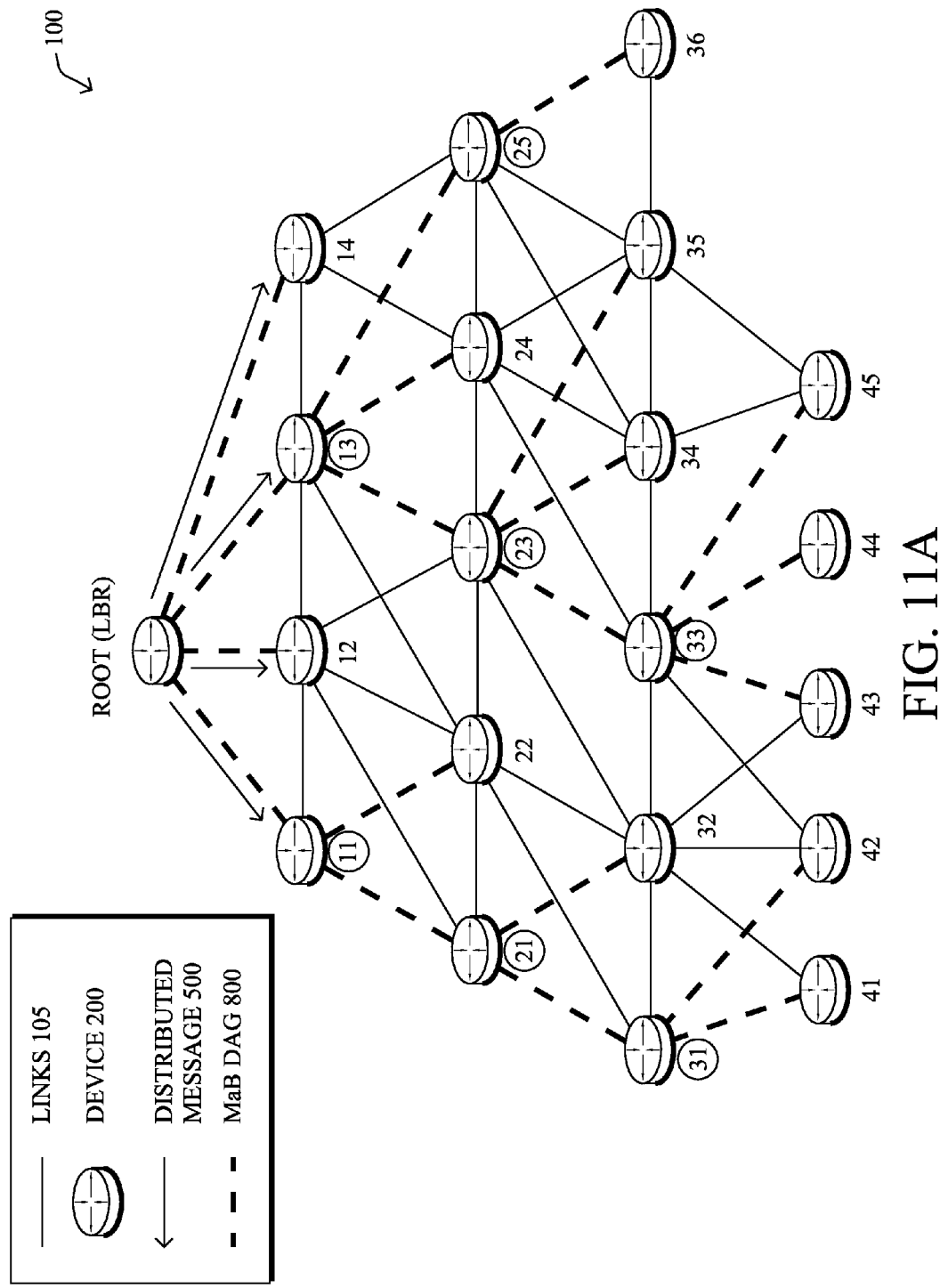
FIGS. 11A-D illustrate an example of a distributed message on the example MaB DAG in the network of FIG. 10.
Figure 11B:
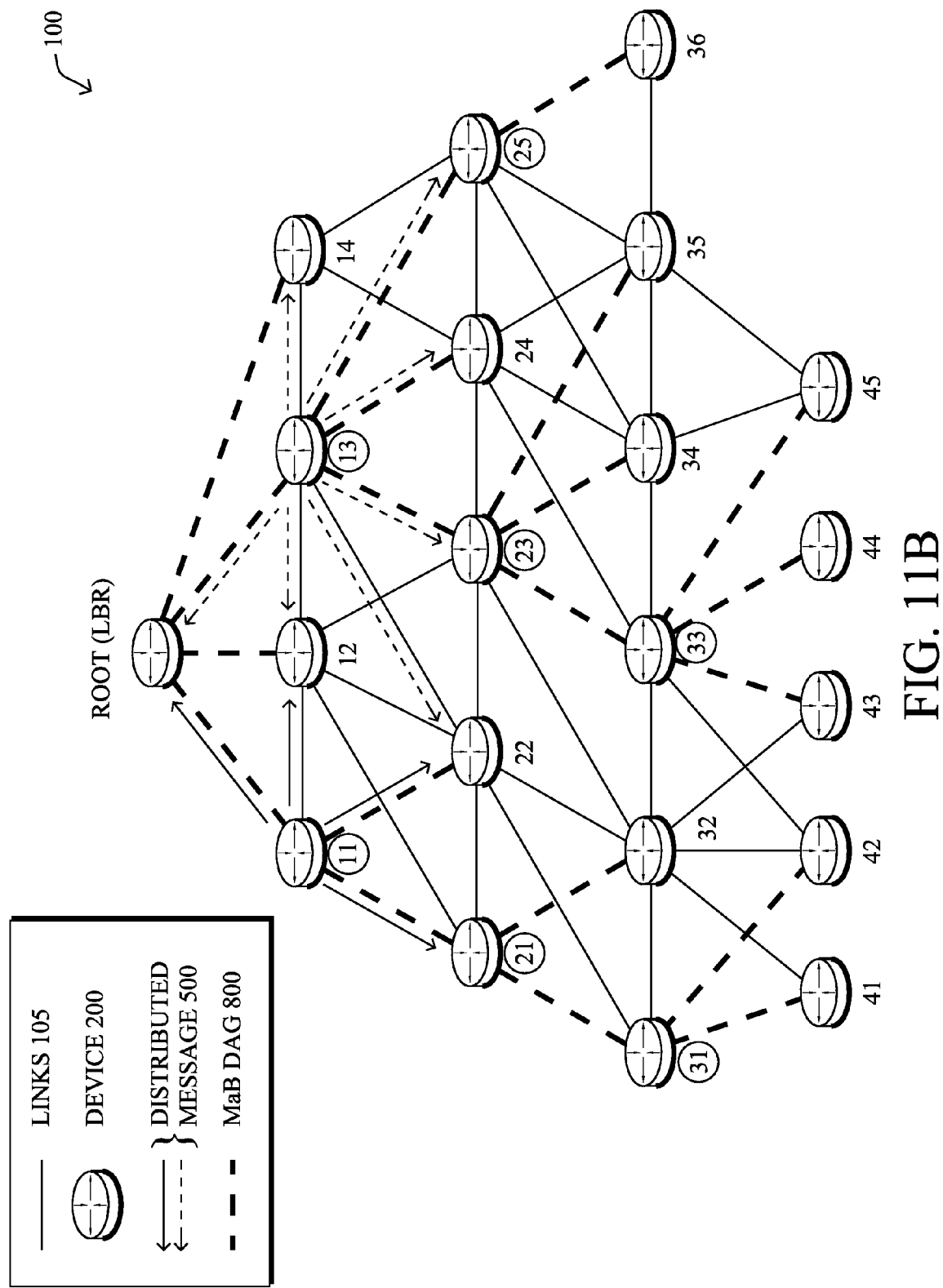
Figure 11C:
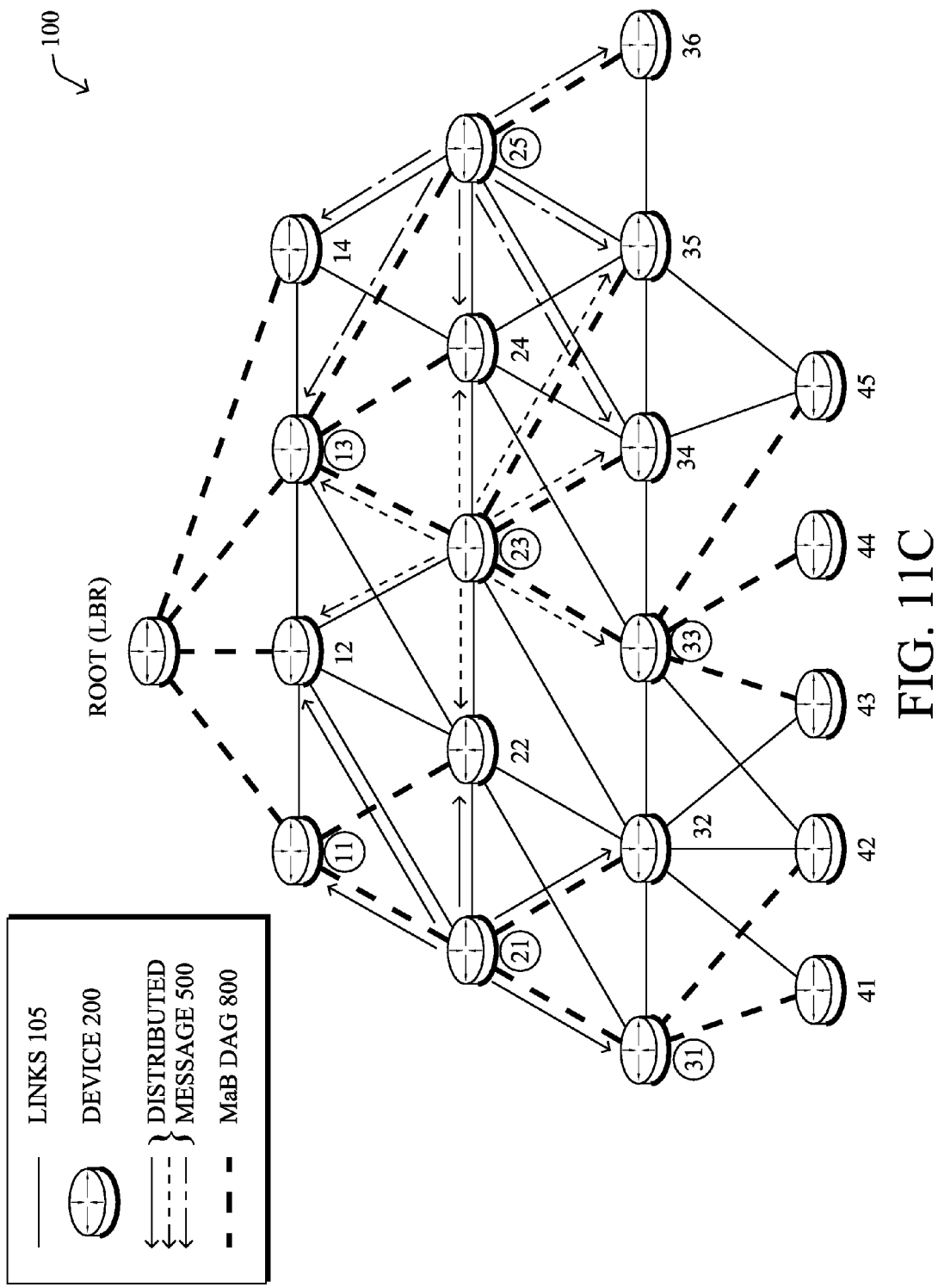
Figure 11D:
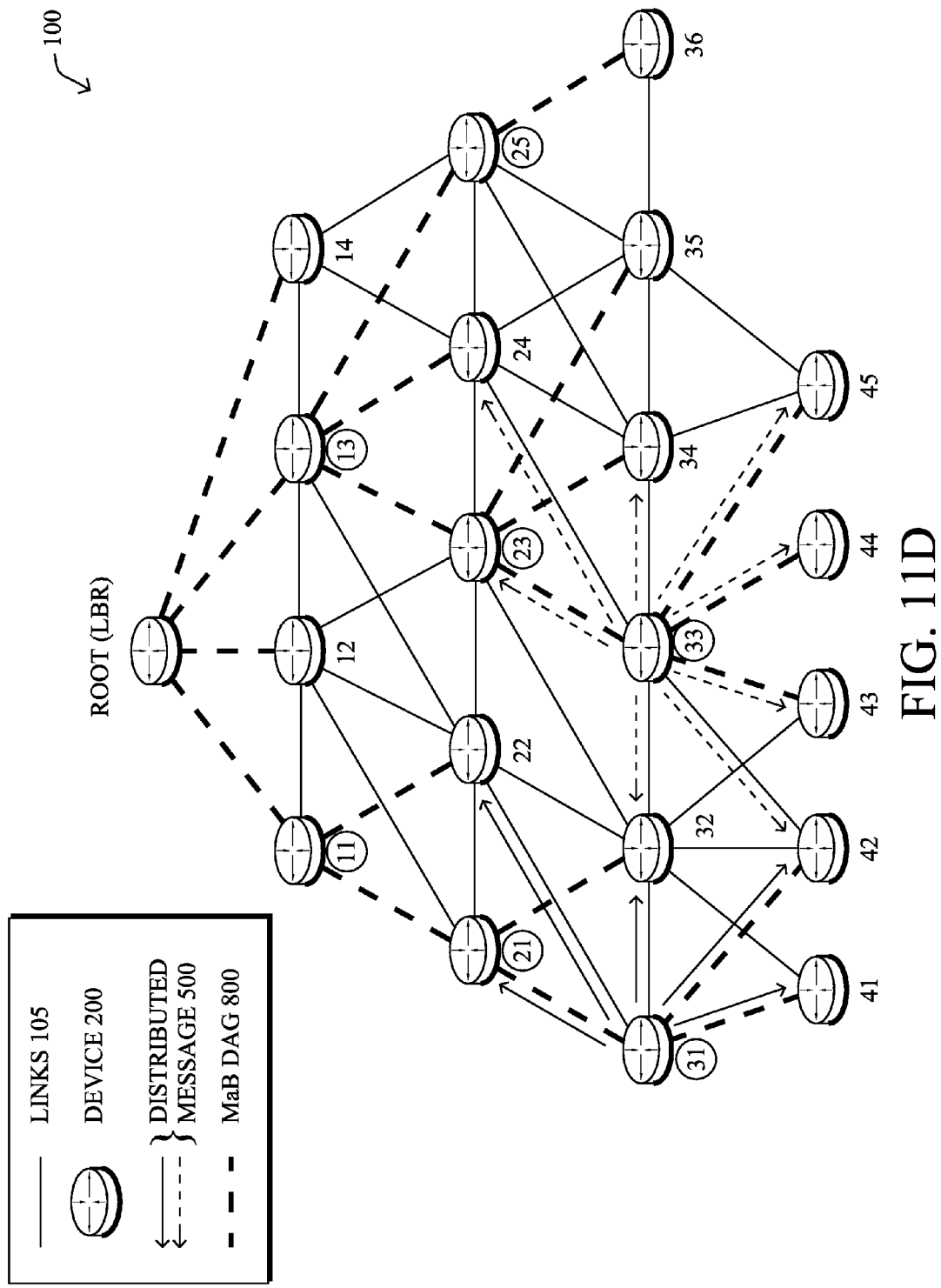

FIGS. 11A-D illustrate an example distributed message transmission on the MaB DAG 800 as last enhanced in FIG. 10 above. Similar to FIG. 5A, FIG. 11A shows the first stage of a distributed message initiated by the root node, reaching nodes 11, 12, 13, and 14. Contrary to all of these nodes repeating the transmission (as they did in FIG. 5B), however, FIG. 11B illustrates how only the selected distributing parents, nodes 11 and 13, repeat/forward the distributed message 500. Though it is readily apparent that the traffic in the network is already greatly reduced, and thus so are the congestion and processing utilization at the nodes, FIGS. 11C and 11D continue the progression of the distributed message 500. According to the techniques herein, therefore, each node in the network 100 has received a copy of the distributed message 500 by FIG. 11D, and the excess traffic was much reduced in comparison to FIGS. 5A-E. That is, where before twenty of twenty nodes repeated the distributed message in FIGS. 5A-E, now only nine adaptively selected nodes repeated the message 500 in FIGS. 11A-D based on the techniques herein.

Further, in one or more embodiments, continued MaB DAG maintenance is provided by updating distributing parents based on receipt of messages 500. In particular, though difficult if only one distributing parent is selected, in the event that a node determines that a distributed message is received from fewer than the number of selected distributing parents (e.g., fewer than a plurality of redundant distributing parents, or else overhearing a message 500 from a node not selected as a distributing parent, and not hearing that same message from the originally selected distributing parent), then that node may deterministically replace those "missing" distributing parents from which a distributed message was not received. Said differently, if a node receives less than N copies of distributed messages, it may determine that one of its distribution paths (e.g., a redundant path) has failed (node or link failure). As such, this node may send a beacon message to its neighbors asking if they can assume the role of its distributing parent in MaB DAG 800. Once the node receives messages from potential distributing parents, an additional deterministic selection may be made (e.g., the highest MAC address), along with the associated notifications and duplex handshaking (acknowledgments). Other nodes which are not notified by this node (via the full duplex handshake) that they have been selected as distributing parents remain in whichever state they were previously.

Another form of MaB DAG maintenance considers the dynamicity of the network, where nodes may be added or removed, where nodes may become reachable or not, etc. Specifically, the techniques above have generally described an initial configuration state within a stable network topology. However, in certain embodiments, a node which has selected a distributing parent may change selection to a new distributing parent node (e.g., with a higher MAC address) that joins the DAG. Also, a node may be required to select a new distributing parent if a previously selected parent is not longer reachable.

Figure 12A:
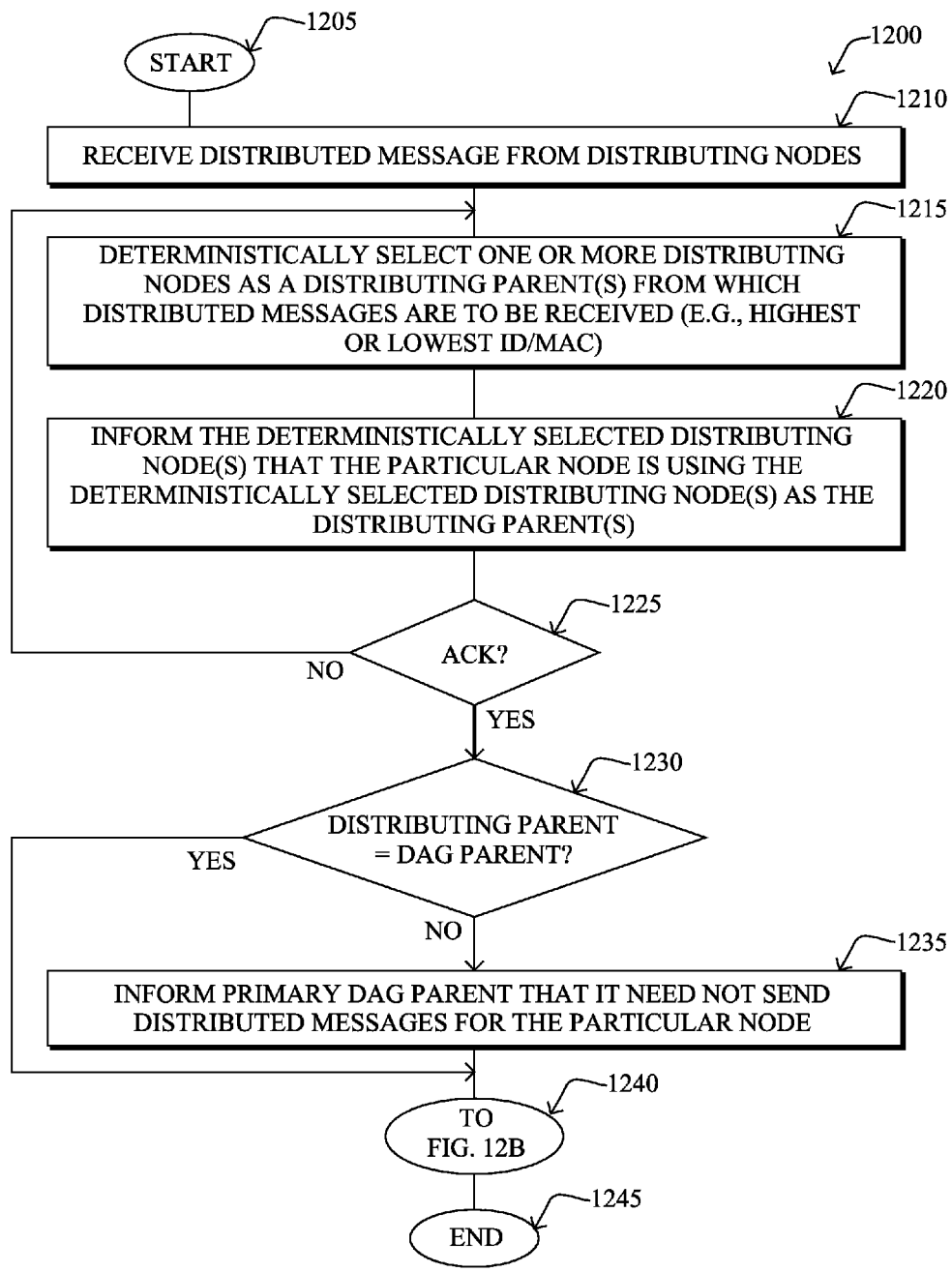
FIGS. 12A-B illustrate an example simplified procedure for selecting distributing parents on a MaB DAG.
Figure 12B:
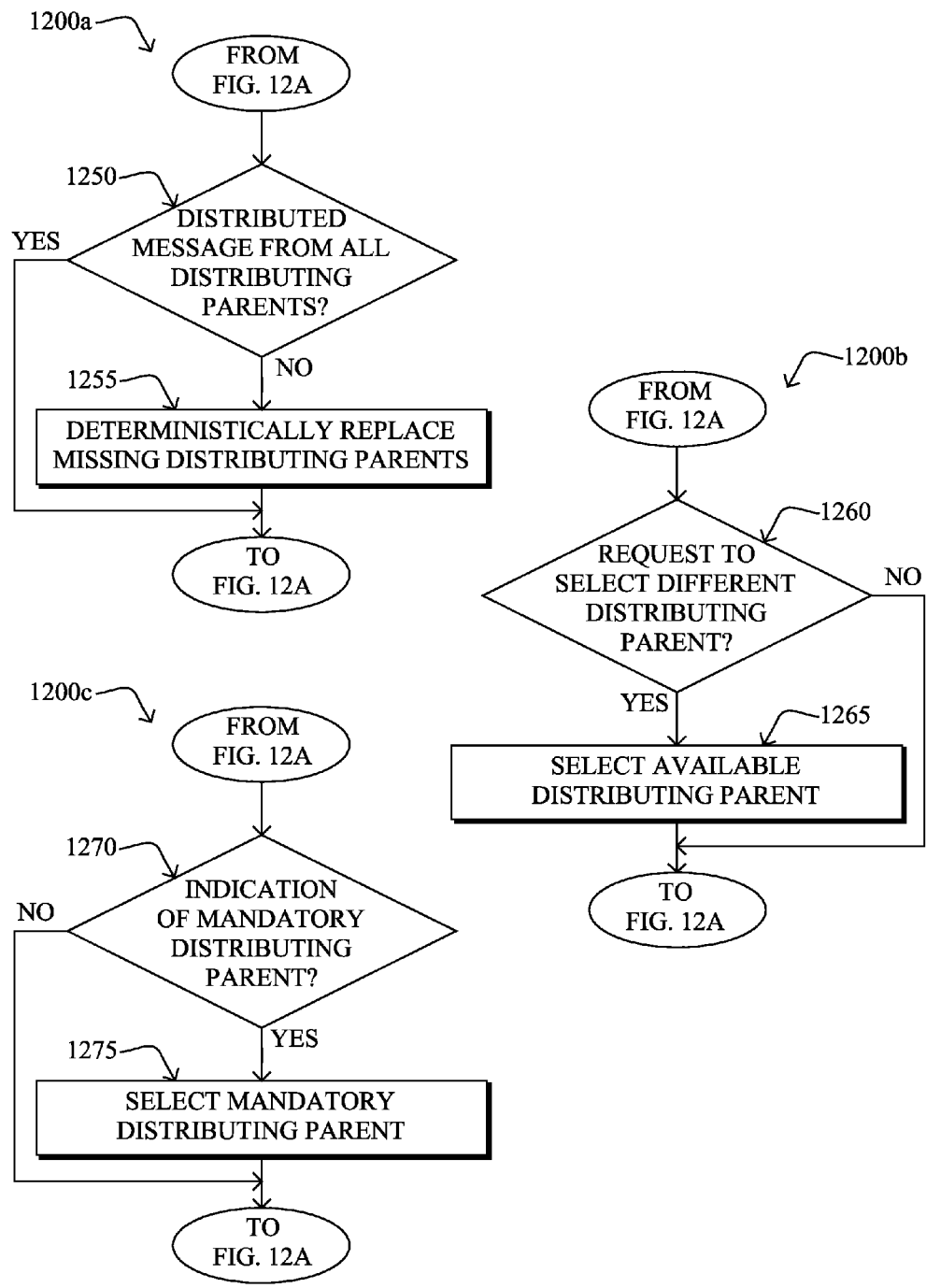

FIGS. 12A-B illustrate an example simplified procedure for selecting distributing parents on a MaB DAG in accordance with one or more embodiments described herein. The procedure 1200 starts at step 1205, and continues to step 1210, where a node (e.g., node 34) in a primary DAG 410 receives a distributed message 500 from one or more distributing nodes, e.g., as shown in FIGS. 5A-E. As described in greater detail above, in step 1215 the node deterministically selects one or more of the distributing nodes as a distributing parent for MaB DAG 800 from which distributed messages are to be received. For instance, this decision may be based on a highest or lowest ID (e.g., MAC address). In step 1220, the node informs the deterministically selected distributing lo node(s) (e.g., node 23) that the particular node is using the deterministically selected distributing node(s) as the distributing parent(s), e.g., a notification 700 as shown in FIG. 7. If no acknowledgment ("ack") is received in step 1225 (e.g., after additional attempts to relay the notification 700 before deciding that no ack is being returned), then a new distributing parent may be selected in step 1215. Otherwise, if a acknowledgment is received, then if the selected distributing parent is not the node's primary DAG parent in step 1230 (e.g., node 23 is not node 34's primary DAG parent), then in step 1235 the primary DAG parent (e.g., node 24) is informed that it need not send distributed messages for the particular node (e.g., node 34).

The procedure 1200 in step 1240 may illustratively visit one or more of a plurality of optional sub-procedures as shown in FIG. 12B prior to ending in step 1245. For instance, in sub-procedure 1200a, where a plurality of redundant distributing parents are selected in step 1215, the node may determine in step 1250 whether it has received distributed messages from all of its distributing parents. If not, then in step 1255 the node may deterministically replace the missing distributing parents as described above. Also, in sub-procedure 1200b, in certain embodiments the node may receive a request to select different distributing parent in step 1260, such as in response to a selected distributing parent having only a few child nodes, or else for other reasons. If so, then in step 1265 the node may select another distributing parent, assuming one is available. Further, as shown in sub-procedure 1200c, there may be instances where the node receives an indication of there being a mandatory distributing parent nearby in step 1270. As such, in step 1275, the node may, though need not, select the mandatory distributing parent in an attempt to consolidate distributing parents in the MaB DAG 800. Note that a "mandatory" parent herein may be configurable, such as being "mandatory" because it is a node with high computational power, is not battery operated (e.g., is "main-powered, etc.).

Figure 13A:
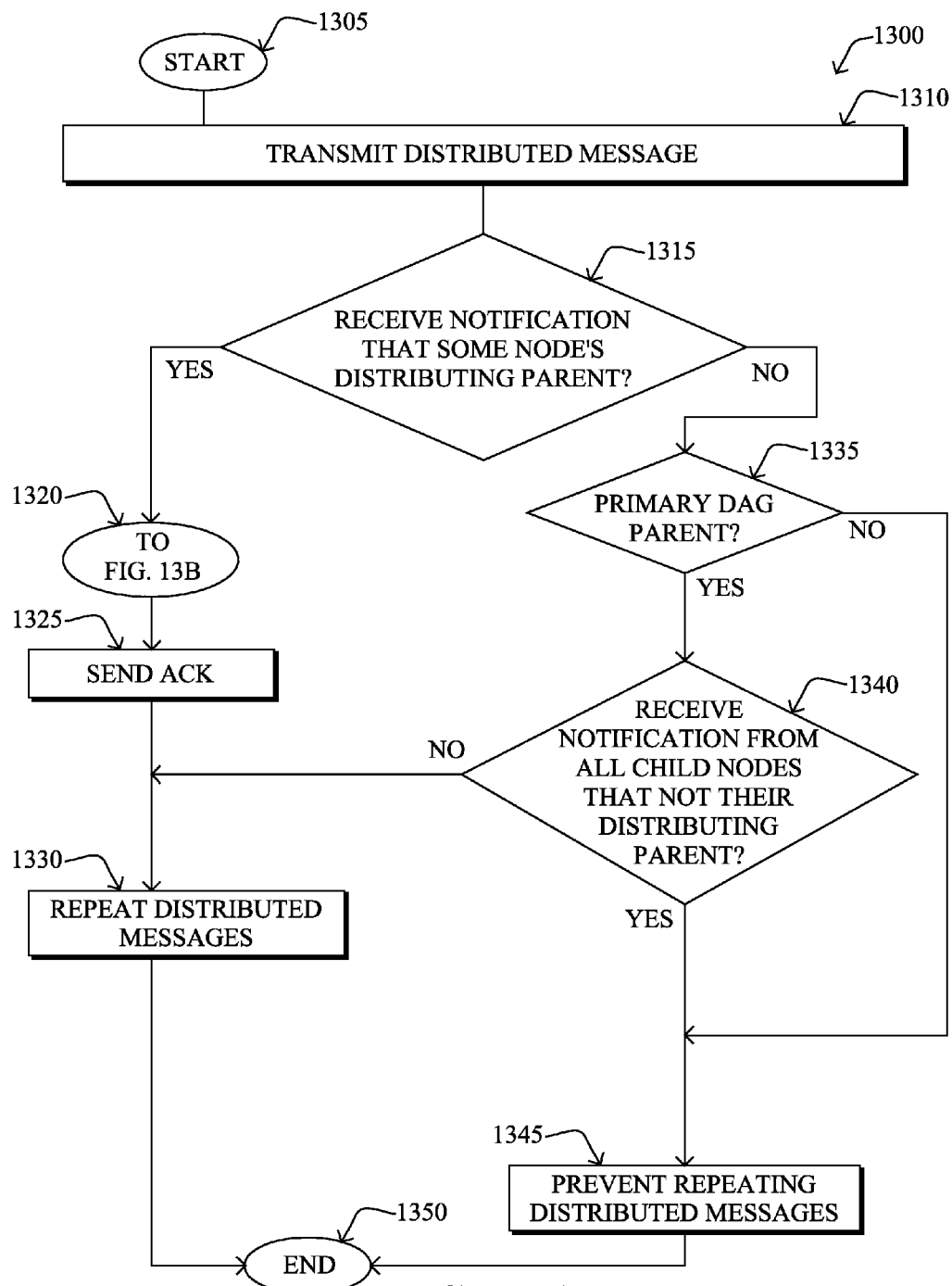
FIGS. 13A-B illustrate an example simplified procedure for distributing parent operation.
Figure 13B:
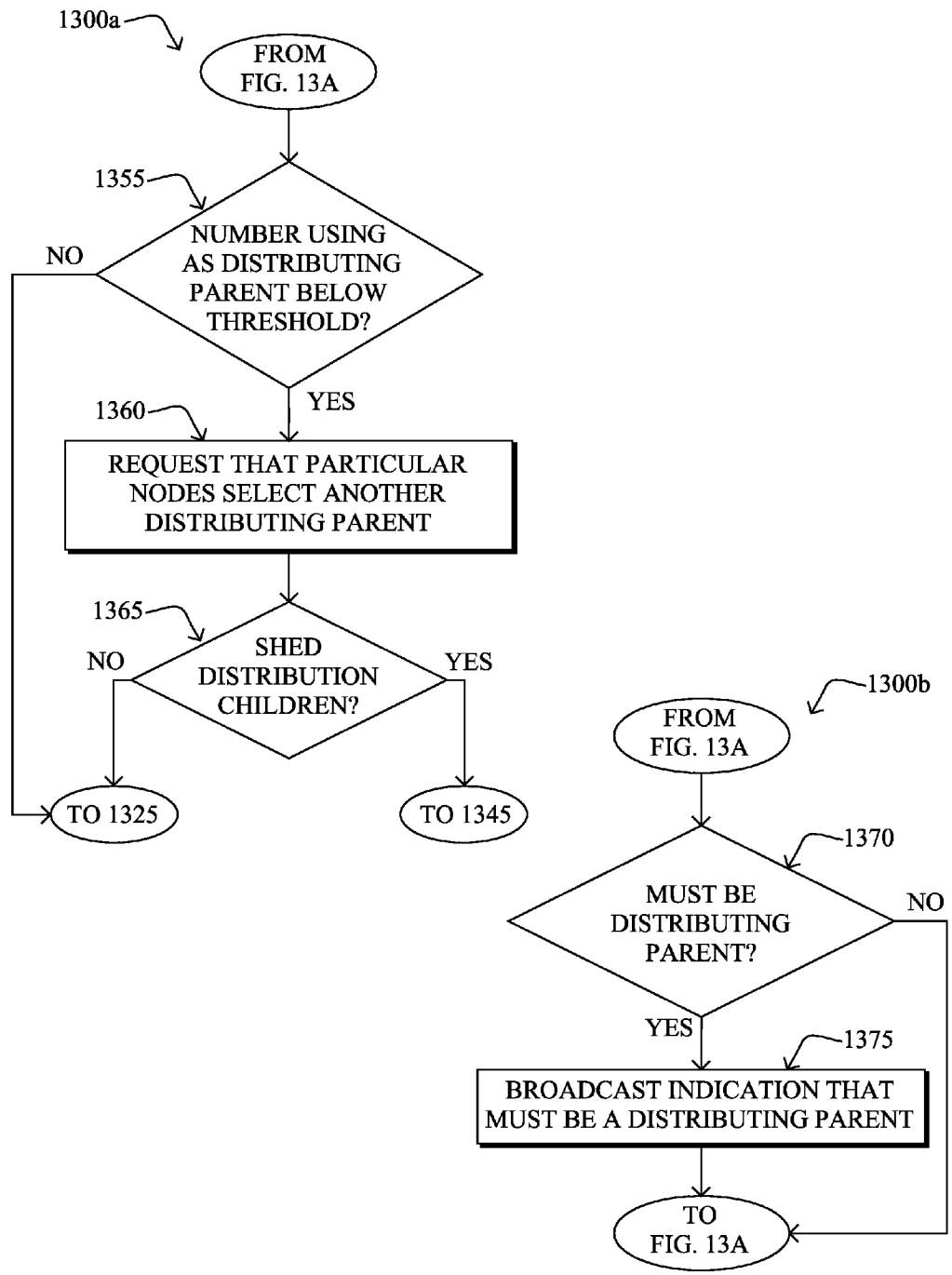

In addition, FIGS. 13A-B illustrate an example simplified procedure for distributing parent operation in accordance with one or more embodiments described herein. The procedure 1300 starts at step 1305, and continues to step 1310, where, each node (distributing node) in the network 100 transmits (repeats) a received distributed message 500, e.g., as described with reference to FIGS. 5A-E above. In response, in step 1315, a particular node (e.g., node 23) may receive a notification 700 that it has been selected as some node's distributing parent (e.g., from node 34 as in FIG. 7) in a MaB DAG 800. If so, then after optionally proceeding in step 1320 to sub-procedures shown in FIG. 13B, the node, now a distributing parent, returns an acknowledgment in step 1325 to its distribution child, and then in step 1330 sets its state accordingly for the MaB DAG to repeat distributed messages as received, and the procedure ends in step 1350. (Note that primary DAG parents have already set their state to repeat distributed messages for their DAG children.)

Alternatively, if in step 1315 there is no notification received by the distributing node indicating that it is a distributing parent, and the node is a primary DAG parent in step 1335, then in step 1340 the primary DAG parent may determine whether it has received notifications from all of its primary DAG child nodes that the primary DAG parent is not their distributing parent. For instance, this may be the case in embodiments where a primary DAG parent is assumed to be a distributing parent without hearing otherwise (i.e., child nodes need not inform their primary DAG parent that the primary DAG parent is also a distributing parent for the child node). If certain child nodes that have not indicated that the primary DAG parent is not their distributing parent in step 1340, then the primary DAG parent is assumed to be a distributing parent, and repeats distributed messages in step 1330, accordingly. In the absence of any reason to repeat distributed messages, a DAG parent (or a node not a primary DAG parent nor a distributing parent in step 1335) may set its state as a non-distributing parent accordingly to prevent repeating distributed messages in step 1345, and the procedure 1300 ends in step 1350. Note that the selection of distributing parents may change node's states adaptively in response to changes in the network, such as returning to step 1310 or 1315 to change the state based on whether child nodes change their distributing parent selection.

Further to FIG. 13A, FIG. 13B illustrates example sub-procedures that may illustratively occur at step 1320 of procedure 1300 in certain embodiments described herein. For instance, a first sub-procedure 1300a may determine in step 1355 whether a selected distributing parent has a number of distribution children that is below some configured threshold (e.g., as shown in FIG. 10 above). If so, then in step 1360 the distributing parent may request that particular ones of its child nodes select another distributing parent. If the distribution child nodes are all shed in step 1365, then sub-procedure 1300a returns to primary procedure 1300 at step 1345. Otherwise, the return is to step 1325 having been unable to shed its (e.g., few) distribution children.

Also, as shown in sub-procedure 1300b, in one or more embodiments described is herein a distributing parent may determine in step 1370 whether it must be distributing parent to a particular child node (e.g., as shown in FIG. 9 above). If so, then in step 1375 the distributing parent may broadcast (e.g., a single hop broadcast message) an indication that it must be a distributing parent, in the hope that other nodes will change their distributing parent selection to the mandatory distributing parent, potentially alleviating other nodes from having to be distributing parents, as noted above.

It should be noted that FIGS. 12A-13B are merely examples for illustration, and are not meant to be limiting to the scope of the embodiments herein. For instance, while certain steps within the procedures 1200 and 1300 may be optional as described above, certain steps may be included or excluded as desired, and the steps may also be in a different order where suitable.

The novel techniques described herein, therefore, provide for efficient message distribution in a computer network. In particular, the techniques herein minimize the number of packets sent over the shared medium, and as such reduce packet collisions which increases network efficiency. For instance, the techniques herein reduce the number of duplicate distributed (broadcast/multicast) packets which need to be processed by the various nodes, thus reducing the wasted resources which are required for transmitting the messages by a first node, receiving the duplicate packets (at times hundreds of them) by a second node, comparing the IDs of the received packet with IDs of packets previously received, and discarding the duplicate packets once they have been identified as such. Additionally, by eliminating many of disruptive transmissions, the system greatly reduces the average power consumption of the nodes in the system which is especially important for low power battery operated nodes. Further, the reliability of message delivery is maintained by the techniques of one or more embodiments herein by providing a tree recovery mechanism which ensures that (when routes are available) each node receives a managed/controlled number, N, of duplicate packets.

In addition, the embodiments herein utilize distributed computing, based on readily available information (primary DAG 410) as a starting point, to dynamically compute MaB DAGs 800. As such, the techniques scale well and reduce the amount of required computation overhead and management overhead traffic. That is, the techniques herein minimize communication overhead by relying on a peer-to-peer information exchange rather than requiring sending information to a central computation/simulation server.

While there have been shown and described illustrative embodiments that provide for efficient message distribution in a computer network (e.g., broadcast, multicast, etc.), it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not as limited, and may, in fact, be used with other types of networks and/or protocols utilizing DAG routing (e.g., distance vector protocols). Also, while the techniques described above generally reference wireless communication, other shared media (e.g., PLC) may be used. Further, while the example embodiments above adaptively construct the MaB DAG based on observations of broadcast or multicast distributed message 500, the same techniques may be used adaptively construct the MaB DAG based on neighborhood tables and other indications of the specific underlying topology of nodes 200.

Moreover, in one or more embodiments, nodes may randomly defer their selection of the set of distributing parents by listening to the choice of their neighbors in order to preferably choose the same parents and thus reduce the number of distributed messages in the network. In other words, by eavesdropping on its neighbors to determine deterministically selected distributing parents of other nodes, a particular node may limit its own deterministic selection of its distributing parent(s) from those of other (e.g., nearby) nodes.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
 receiving a distributed message from one or more distributing nodes at a particular node in a primary directed acyclic graph (DAG) in a computer network;
 deterministically selecting a distributing node from the one or more distributing nodes as a distributing parent for a secondary DAG from which distributed messages are to be received;
 informing the deterministically selected distributing node that the particular node is using the deterministically selected distributing node as the distributing parent; and
 in response to the distributing parent not being a primary DAG parent of the particular node, informing the primary DAG parent that the primary DAG parent need not send distributed messages for the particular node.

2. The method as in claim 1, wherein informing the primary DAG parent that the primary DAG parent need not send distributed messages for the particular node is further in response to receiving an acknowledgment from the distributing parent that the distributing parent will send distributed messages for the particular node.

3. The method as in claim 1, wherein deterministically selecting comprises:
 determining an identification (ID) of the one or more distributing nodes; and
 selecting the distributing parent as one of either the highest ID or lowest ID based on configuration shared with all nodes of the DAG.

4. The method as in claim 3, wherein the ID is a media access control (MAC) address.

5. The method as in claim 1, wherein the deterministically selected distributing node is a first distributing node, the method further comprising:
 deterministically selecting a second distributing node as the distributing parent for the secondary DAG based on a topology change in the computer network;
 informing the second distributing node that the particular node is using the second distributing node as the distributing parent; and
 informing the first distributing node that the particular node is not using the first distributing node as the distributing parent.

6. The method as in claim 1, wherein deterministically selecting comprises:
 deterministically selecting a plurality of distributing nodes to be a plurality of redundant distributing parents from which redundant distributed messages are to be received by the particular node.

7. The method as in claim 6, further comprising:
 determining that a distributed message is received by the particular node by fewer than the plurality of redundant distributing parents; and
 in response, deterministically replacing those distributing parents from which a distributed message was not received.

8. The method as in claim 1, wherein deterministically selecting comprises:
 limiting the deterministic selection of the distributing parent for the particular node from one or more distributing nodes that are at a same or lower rank in the primary DAG than the particular node.

9. The method as in claim 1, further comprising:
 receiving a request from the distributing parent to select a different distributing parent; and
 in response, if a second distributing parent is available, selecting the second distributing parent.

10. The method as in claim 1, further comprising:
 receiving an indication that a particular distributing node of the one or more distributing nodes must be a distributing parent to at least one node in the secondary DAG; and
 in response, selecting the particular distributing node as the distributing parent for the particular node.

11. The method as in claim 1, wherein the distributed message is selected from a group consisting of a broadcast message and a multicast message.

12. An apparatus, comprising:
 one or more network interfaces to communicate in a primary directed acyclic graph (DAG) in a computer network as a particular node;
 a processor coupled to the network interfaces and adapted to execute one or more processes; and
 a memory configured to store a process executable by the processor, the process when executed operable to:
  determine a set of one or more distributing nodes from which a distributed message is received;
  deterministically select a distributing node from the one or more distributing nodes as a distributing parent for a secondary DAG from which distributed messages are to be received;
  inform the deterministically selected distributing node that the particular node is using the deterministically selected distributing node as the distributing parent; and
  in response to the distributing parent not being a primary DAG parent of the particular node, inform the primary DAG parent that the primary DAG parent need not send distributed messages for the particular node.

13. The apparatus as in claim 12, wherein the process when executed is further operable to inform the primary DAG parent that the primary DAG parent need not send distributed messages for the particular node in further response to receiving an acknowledgment from the distributing parent that the distributing parent will send distributed messages for the particular node.

14. The apparatus as in claim 12, wherein the process when executed to deterministically select is further operable to:
 determine an identification (ID) of the one or more distributing nodes; and
 select the distributing parent as one of either the highest ID or lowest ID based on configuration shared with all nodes of the primary DAG.

15. The method as in claim 14, wherein the ID is a media access control (MAC) address.

16. The apparatus as in claim 12, wherein the process when executed to deterministically select is further operable to:
 deterministically select a plurality of distributing nodes to be a plurality of redundant distributing parents from which redundant distributed messages are to be received by the particular node.

17. A tangible, non-transitory, computer-readable media having software encoded thereon, the software when executed by a processor on a particular node in a primary directed acyclic graph (DAG) operable to:
 determine a set of one or more distributing nodes from which a distributed message is received;

deterministically select a distributing node from the one or more distributing nodes as a distributing parent for a secondary DAG from which distributed messages are to be received;

inform the deterministically selected distributing node that the particular node is using the deterministically selected distributing node as the distributing parent; and in response to the distributing parent not being a primary DAG parent of the particular node, inform the primary DAG parent that the primary DAG parent need not send distributed messages for the particular node.

18. A method, comprising:

transmitting a distributed message from a distributing node in a primary directed acyclic graph (DAG) in a computer network;

in response to receiving a notification that a particular node is using the distributing node as a distributing parent, repeating distributed messages from the distributing node in a secondary DAG; and in response to the distributing node being a primary DAG parent having received a notification from all child nodes of the primary DAG parent that the primary DAG parent need not send distributed messages for the respective child node, preventing repeating of distributed messages from the distributing node in the secondary DAG.

19. The method as in claim 18, further comprising:

in response to receiving the notification that the particular node is using the distributing node as a distributing parent, sending an acknowledgment to the particular node that the distributing node is the distributing parent for the particular node.

20. The method as in claim 18, wherein the distributing node is a primary DAG parent, the method further comprising:

receiving, within the notification from a particular child node of the distributing node that the distributing node need not send distributed messages for the particular child node, a list of one or more distributing parents of the particular child node; and preventing repeating of distributed messages from the distributing node in further response to the list of one or more distributing parents of the particular child node not containing any potential child nodes of the distributing node.

21. The method as in claim 18, further comprising:

in response to a number of particular nodes using the distributing node as a distributing parent being below a threshold, requesting that the particular nodes using the distributing node as a distributing parent select another distributing parent.

22. The method as in claim 18, further comprising:

determining that the distributing node must be a distributing parent for at least one particular node in the secondary DAG; and in response, broadcasting an indication that the distributing node must be a distributing parent in the secondary DAG.

23. The method as in claim 18, wherein the distributed message is selected from a group consisting of a broadcast message and a multicast message.

24. An apparatus, comprising:

one or more network interfaces to communicate in a primary directed acyclic graph (DAG) in a computer network;

a processor coupled to the network interfaces and adapted to execute one or more processes; and a memory configured to store a process executable by the processor, the process when executed operable to:

transmit a distributed message into the computer network; and set an operating state of the apparatus as:

i) a distributing parent state in response to receiving a notification that a particular node is using the apparatus as its distributing parent in a secondary DAG, the distributing parent operating state to repeat distributed messages on the secondary DAG; and ii) a non-distributing node state in response to the apparatus being a primary DAG parent having received a notification from all child nodes of the apparatus that the apparatus need not send distributed messages for the respective child node, the non-distributing node operating state to prevent repeating of distributed messages from the apparatus on the secondary DAG.

25. The apparatus as in claim 24, wherein the process when executed is further operable to:

receive, within the notification from a particular child node of the apparatus that the apparatus need not send distributed messages for the particular child node, a list of one or more distributing parents of the particular child node; and set an operating state as the non-distributing parent in further response to the list of one or more distributing parents of the particular child node not containing any potential child nodes of the apparatus.

26. The apparatus as in claim 24, wherein the process when executed is further operable to:

in response to a number of particular nodes using the apparatus as a distributing parent being below a threshold, request that the particular nodes using the apparatus as a distributing parent select another distributing parent.

27. The apparatus as in claim 24, wherein the process when executed is further operable to:

determine that the apparatus must be a distributing parent for at least one particular node in the secondary DAG; and in response, broadcast an indication that the apparatus must be a distributing parent in the secondary DAG.

28. A tangible, non-transitory, computer-readable media having software encoded thereon, the software when executed by a processor on a device in a primary directed acyclic graph (DAG) operable to:

transmit a distributed message from the device;

in response to receiving a notification that a particular node is using the device as a distributing parent in a secondary DAG, repeat distributed messages from the device on the secondary DAG; and in response to the device being a primary DAG parent having received a notification from all child nodes of the device that the device need not send distributed messages for the respective child node, prevent repeating of distributed messages from the device on the secondary DAG.

* * * * *

UNITED STATES PATENT AND TRADEMARK OFFICE
CERTIFICATE OF CORRECTION

PATENT NO. : 8,595,359 B2
APPLICATION NO. : 13/043168
DATED : November 26, 2013
INVENTOR(S) : Shmuel Shaffer et al.

Page 1 of 1

It is certified that error appears in the above-identified patent and that said Letters Patent is hereby corrected as shown below:

In the Specification

Column 2, line 62, please amend as shown:

at different[[ to]] locations, such as, e.g., energy/power consump-

Column 7, line 19, please amend as shown:

toward the leaves, informing each successive[[ s]] receiving

Column 7, line 27, please amend as shown:

reach the[[ to]] leaves for downward routes. Nodes that are

Column 11, line 55, please amend as shown:

node as a distributing parent, then the operating state of[[ lo]] that

Column 14, line 24, please amend as shown:

node informs the deterministically selected distributing[[ lo]]

Column 15, line 52, please amend as shown:

embodiments described[[ is]] herein a distributing parent may

Signed and Sealed this
Seventeenth Day of June, 2014

Michelle K. Lee
*Deputy Director of the United States Patent and Trademark Office*